(12) United States Patent
Peyton et al.

(10) Patent No.: US 7,617,489 B2
(45) Date of Patent: *Nov. 10, 2009

(54) METHOD AND SYSTEM FOR DETECTING INTERPROCEDURAL VULNERABILITY BY ANALYSIS OF SOURCE CODE

(75) Inventors: John Peyton, Arlington, MA (US); Robert Gottlieb, Westford, MA (US)

(73) Assignee: Ounce Labs, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/522,039

(22) Filed: Sep. 15, 2006

(65) Prior Publication Data

US 2008/0072214 A1 Mar. 20, 2008

(51) Int. Cl.
*G06F 9/44* (2006.01)

(52) U.S. Cl. .................. 717/133; 717/141; 717/143; 717/155

(58) Field of Classification Search .................. 717/143
See application file for complete search history.

(56) References Cited

U.S. PATENT DOCUMENTS

| 5,440,723 | A | 8/1995 | Arnold et al. | |
|---|---|---|---|---|
| 6,343,376 | B1 * | 1/2002 | Saxe et al. | 717/154 |
| 6,412,071 | B1 * | 6/2002 | Hollander et al. | 726/23 |
| 7,051,322 | B2 * | 5/2006 | Rioux | 717/143 |
| 2003/0172293 | A1 * | 9/2003 | Johnson et al. | 713/200 |
| 2004/0255277 | A1 | 12/2004 | Berg | |
| 2004/0260940 | A1 | 12/2004 | Berg | |
| 2005/0010806 | A1 | 1/2005 | Berg | |
| 2005/0015752 | A1 | 1/2005 | Alpern et al. | |
| 2007/0083933 | A1 * | 4/2007 | Venkatapathy et al. | 726/25 |

OTHER PUBLICATIONS

Aho, et al., "Principles of Compiler Design," Addison-Wesley Publishing Co., Mar. 1978.
Ashcraft, et al., "Using Programmer-Written Compiler Extensions to Catch Security Holes", IEEE Symposium on Security and Privacy, Oakland, CA, May 2002.
Banatre, et al., "Mechanical Proofs of Security Properties," Institut de Recherche en Informatique et Systemes Aleatoires, Centre National de la Recherche Scientifique (URA 227) Universite de Rennes 1, Insa de Rennes, France, ISSN 1166-8687, Publication Interne No. 825, May 1994.

(Continued)

*Primary Examiner*—Lewis A Bullock, Jr.
*Assistant Examiner*—Michael Yaary
(74) *Attorney, Agent, or Firm*—Wilmer Cutler Pickering Hale and Dorr LLP

(57) ABSTRACT

Methods and systems of detecting vulnerabilities in source code using inter-procedural analysis of source code. Vulnerabilities in a pre-existing source code listing are detected. The variables in the source code listing are modeled in the context of at least one of the inherent control flow and inherent data flow. The variable models are used to create models of arguments to routine calls in the source code listing. The source code listing is modeled with a call graph to represent routine call interactions expressed in the source code listing. The arguments to routine calls are modeled to account for inter-procedural effects and dependencies on the arguments as expressed in the source code listing.

12 Claims, 16 Drawing Sheets

OTHER PUBLICATIONS

Bush, et al., "A Static Analyzer for Finding Dynamic Programming Errors", Software—Practice and Experience, vol. 30, No. 7, 2000.

Chess, et al., "Improving Computer Security Using Extended Static Checking," IEEE Symposium on Security and Privacy (May 2002).

Chess, et al., "Static Analysis for Security," IEEE Computer Society, IEEE Security and Privacy, 1540-7993 (2004).

Detlefs, et al., "Extended Static Checking," Technical Report 159, Compaq Systems Research Center (1998).

Dijkstra, E.W., "Guarded Commands, Nondeterminacy and Formal Derivation of Programs," Communications of the ACM, vol. 18, No. 8, pp. 453-457 (Aug. 1975).

Frailey, D.J., "An Intermediate Language for Source and Target Independent Code Optimization," ACM, 0-89791-002-8/79/0800-0188, pp. 188-200 (1979).

Gordon, et al., "Typing a Multi-Language Intermediate Code," Technical Report MSR-TR-2000-106, Microsoft Research, Microsoft Corporation (Dec. 2000).

Kiriansky, et al., "Secure Execution Via Program Shepherding," 11th USENIX Security Symposium (Security '02), San Francisco, CA (Aug. 2002).

Leino, et al., "Checking Java Program via Guarded Commands," Technical Report 1999-02, Compaq Systems Research Center (May 1999).

Macrakis, S., "From UNCOL to ANDF: Progress in Standard Intermediate Languages," Open Software Foundation, macrakis@osf.org, pp. 1-18 (1993).

Pincus, J., "Steering the Pyramids—Tools, Technology, and Process in Engineering at Microsoft," Microsoft Research (Oct. 5, 2002).

Schneider, F.B., "Enforceable Security Policies," ACM Transactions on Information and System Security, vol. 3, No. 1, pp. 30-50 (Feb. 2000).

Shankar, et al., "Detecting Format String Vulnerabilities with Type Qualifiers," Proceedings of the 10th USENIX Security Symposium, Washington, DC, Aug. 2001.

Sirer, et al., "An Access Control Language for Web Services," SACMAT '02, Jun. 3-4, 2002, Monterey, CA, ACM 1-58113-496-7/02/0006, pp. 23-30 (2002).

Suzuki, et al., "Implementation of an Array Bound Checker," Defense Advanced Research Projects Agency (Contract FF44620-73-C-0034), Air Force Office of Scientific Research (Contract DAHC-15-72-C-0308), University of Tokyo Computation Center, pp. 132-143, 1997.

"The Java Language Environment," White Paper, Sun Microsystems, Inc. (1997).

Viega, et al., "ITS4: A Static Vulnerability Scanner for C and C++ Code," Proceedings Of The Annual Computer Security Applications Conference (2000).

Wagner, et al., "A First Step Toward Automated Detection of Buffer Overrun Vulnerabilities," Proceedings of the Network and Distributed System Security Symposium, University of California, Berkeley, Feb. 2000.

Zovi, D.D., "Security Applications of Dynamic Binary Translation, Thesis," The University of New Mexico (2002).

* cited by examiner

Collection
- Compilation Units
- Classes
- Global Routines

1502

Compilation Unit
- Filename
- File Scope Routines
- File Scope Variables

1504

Class
- Class Name
- Parent Classes
- Child Classes
- Member Routines
- Member Static Routines
- Member Fields

Call Path Element
- Called Routine 1804
- Call Path Element of instance of the caller (parent in the call graph)
- Index of Operation in caller which called this Routine
- Depth in the call graph 1806

1802

Tainted Trace
- Root Routine of the trace 1816
- List of Tainted Trace Elements 1818

1814

Tainted Trace Element
- Argument 1822
- Call Path Element calling context 1824
- Taint propagation direction 1826

METHOD AND SYSTEM FOR DETECTING INTERPROCEDURAL VULNERABILITY BY ANALYSIS OF SOURCE CODE

BACKGROUND

1. Field of the Invention

The invention relates to computer system security and more particularly to a method and system that detects computer source code vulnerabilities, which may pose security risks.

2. Discussion of Related Art

One of the problems associated with developing computer programs is the difficulty in detecting "vulnerabilities" in the programs. As used herein, the term "vulnerability" refers to a section of user source code which, when executed, has the potential to allow external inputs to cause improper or undesired execution. Typical vulnerabilities include buffer overflow; race conditions; and privilege escalation, each of which poses a vulnerability to the desired, controlled execution of the program. Reviewing source code for vulnerabilities is a difficult, time-consuming process. It requires a full understanding of all potential vulnerabilities, how to spot them, and how to fix them.

Prior methods of detecting vulnerabilities in source code include conducting a lexical analysis of the source code. This involves conducting a search of well-known vulnerabilities and pointing them out as potential vulnerabilities. A problem with this method is that it generates too many false positives. Another method involves conducting a manual, line-by-line analysis of the code. However, this method is very labor intensive.

SUMMARY

The present invention provides methods and systems of detecting vulnerabilities in source code using interprocedural analysis of source code Under one aspect of the invention, vulnerabilities in a pre-existing source code listing are detected. The source code listing has a plurality of routines and a plurality or calls to routines. It also has an inherent control flow and an inherent data flow during its computer execution. The control flow and data flow of the source code listing are analyzed. The variables in the source code listing are modeled in the context of at least one of the inherent control flow and inherent data flow. Each model specifies pre-determined characteristics about each variable. The variable models are used to create models of arguments to routine calls in the source code listing. The source code listing is modeled with a call graph to represent routine call interactions expressed in the source code listing. The arguments to routine calls are modeled to account for inter-procedural effects and dependencies on the arguments as expressed in the source code listing. The argument models are used in conjunction with pre-specified criteria for the corresponding routine calls to determine whether the routine calls possess vulnerabilities as a consequence of the arguments and known routine behavior. A report, usable by a user, is generated that identifies the vulnerabilities.

Under another aspect of the invention, the call graph is used to control the modeling of the routine arguments to account for inter-procedural effects.

Under another aspect of the invention, the modeling of the routine arguments is context sensitive.

Under another aspect of the invention, the call graph model includes branches and wherein a branch may be traversed a plurality of times depending on the expression of the source code listing.

Under another aspect of the invention, a branch is not re-traversed if it has been previously traversed with the same models and with the same values for said models.

BRIEF DESCRIPTION OF THE DRAWINGS

In the Drawing,

FIGS. 15-18 depict information retained in data structures while performing IPVA according to certain embodiments of the invention.

DETAILED DESCRIPTION

Preferred embodiments of the present invention provide a method and system for detecting vulnerabilities in source code. The term "vulnerability," as used herein, refers to a section of user source code which, when executed, has the potential to allow external inputs to cause improper or undesired execution.

Figure 13:
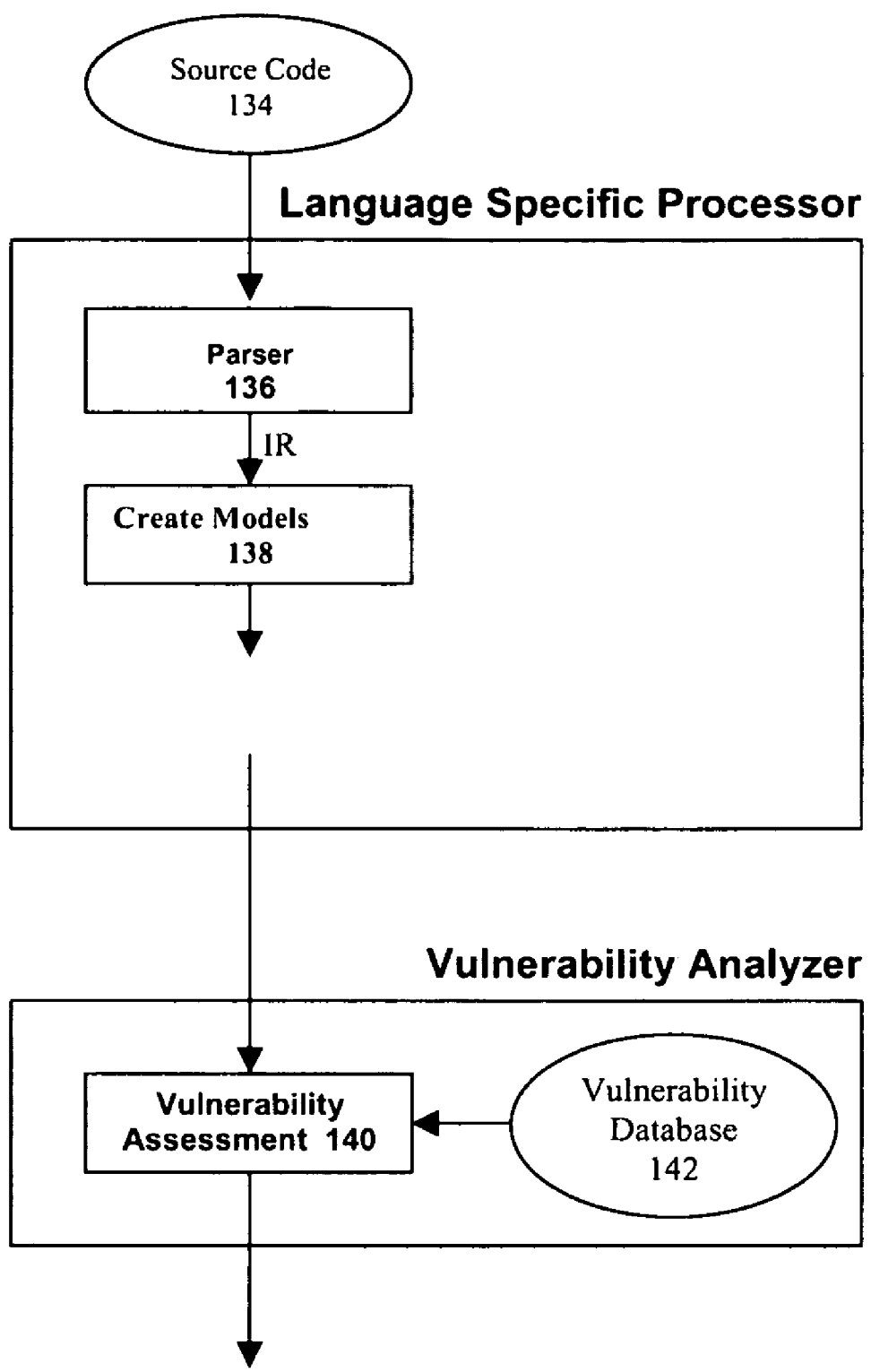
FIG. 13 shows a flow chart of the steps of the system and method of one embodiment of the present invention.

FIG. 13 is a flow chart depicting exemplary logic for analyzing computer programs to detect vulnerabilities such as buffer overflow, race conditions and privilege escalation. The processing has two basic blocks: language specific processing and vulnerability analysis. The language specific processing analyzes the source code and creates models. The language specific processing begins with a language parser 136 receiving the source code 134 to be analyzed and creating an intermediate representation (IR) therefrom. IRs are known in the art and thus the parsing logic is not described here.

Models 138 are created to describe certain characteristics of the source code, and the models are used in conjunction with a vulnerability database 142 in a vulnerability assessment 140 to determine whether a vulnerability exists.

Figure 1:
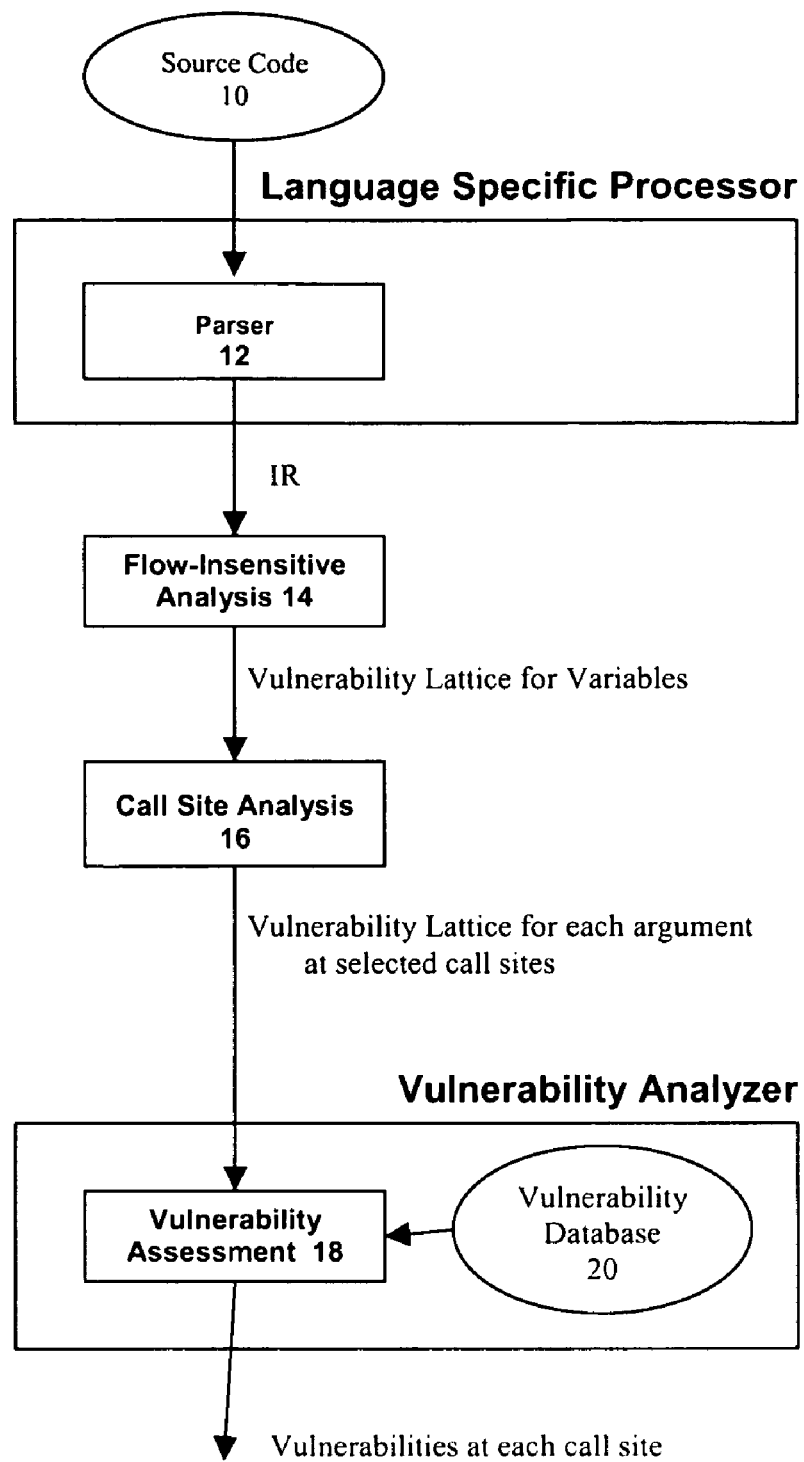
FIG. 1 shows a flow chart of the steps of the system and method of one embodiment of the present invention.

FIG. 1 is a flow chart depicting exemplary logic for analyzing computer programs for buffer overflow vulnerabilities according to certain embodiments of the invention. The processing has two basic blocks: language specific processing and vulnerability analysis.

The language specific processing analyzes the source code and models the arguments used to call select procedures, functions or routines. The models use a unique structure called a "vulnerability lattice." The vulnerability lattice is used to specify, certain relevant information about the argument (whether a variable or expression) such as its memory size, its memory type, etc. This lattice specification is language independent.

The vulnerability analysis uses the vulnerability lattices and other information to analyze the affects of such routine calls with such arguments. This analysis is language independent. The analysis applies rules to determine whether a given routine call in the source code, including the arguments used in such call, pose an inherent vulnerability or risk for certain types of errors. For example, the analysis may determine that a certain routine call with certain arguments at a given location in the source code creates a potential for a buffer overflow error.

Figure 2:
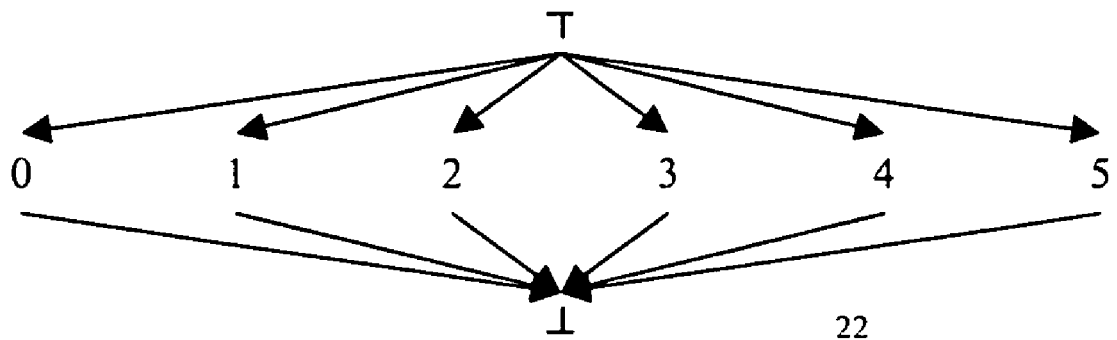
FIG. 2 shows an example of an integral lattice.

Both the language specific processing and the vulnerability assessment utilize lattice structures to model and analyze the variables and expressions that may be used as arguments to routines. By way of background, a lattice represents a refinement of knowledge about the value of an entity. FIG. 2 shows an example of an integral lattice 22 for an integer value. The top value ($\top$) at the top of the lattice represents no knowledge of the value. The bottom value ($\bot$) at the bottom of the lattice represents an unknown value (i.e., no resolution about which of the possible values should be applied). The value(s) between the top value and the bottom value represent the possible value(s) of the entity. In the integral lattice 22 shown in FIG. 2, the integers 0, 1, 2, 3, 4 and 5 are the possible values for the entity.

Language Specific Processing to Create Vulnerability Lattices for Arguments to Select Routines The language specific processing begins with a language parser 12 receiving the source code 10 to be analyzed and creating an intermediate representation (IR) therefrom.

A flow-insensitive analysis 14 analyzes the IR and derives models about each variable in the code. These models are specified in lattice form and called vulnerability lattices. (Lattices in general are known.) Under preferred embodiments a vulnerability lattice (sometimes referred to as an "expression lattice" as well in the paragraphs below) includes a number of other lattices to describe important characteristics of a variable or expression (depending on whether the vulnerability lattice is associated with a variable or expression). More specifically, the vulnerability lattices provide information about the following:
    memory size;
    data size;
    whether data is null terminated;
    the kind of memory contained in a block of memory;
    the constant string value or values for a block of memory; and
    the origin of data.

When determining how a lattice should be set or modified the flow-insensitive analysis logic applies pre-determined merger rules for the various lattice types. This is used, for example, when analyzing expressions.

The flow-insensitive analysis logic also utilizes integral lattices to describe (again in lattice form) integral type variables.

Figure 3:
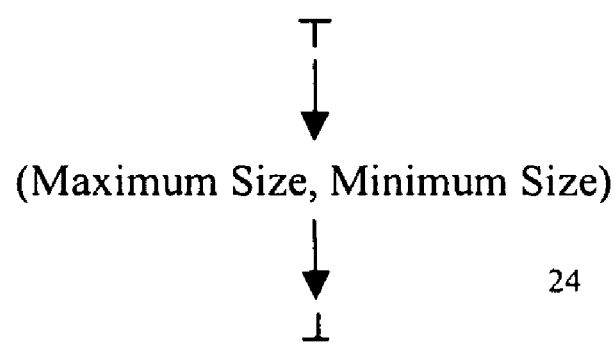
FIG. 3 shown an example of a memory size lattice.

FIG. 3 depicts an example of a memory size lattice 24. Memory size lattice 24 is a lattice consisting of the values high, low, and a pair of non-negative integral values, indicating the possible range of sizes of a block of memory, either directly or referenced via a pointer. This lattice may be used to determine if certain memory operations will overflow the available memory. The merge rules for the memory size lattice 24 are as follows:
    a merge of a high value ($\top$) and any other value will result in the other value;
    a merge of a low value ($\bot$) and any other value will result in a low value; and
    a merge of two memory range lattice values will result in the following:
        range maximum←range$_1$ maximum⌈range$_2$ maximum (⌈ is the "maximum of" operator)
        range minimum←range$_1$ minimum⌊range$_2$ minimum (⌊ is the "minimum of" operator)
For example, an array declared in c or c++ as
    char a[100];
would have a size of 100 bytes, that being the size of 1 entry (1 byte) multiplied by the number of elements in the array (100).

As another example, a memory size lattice representing a range of size values could be useful:

```
char a[100];
char b[200];
char *c = (i == 0) ? a : b;
```

The size of the block of memory pointed to by the variable c in this case could be either 100 bytes or 200 bytes, depending on whether the array a or the array b is selected, which in turn depends on whether another variable i is 0. The memory size lattice result for this variable would specify a maximum size of 200 and a minimum of 100 bytes.

Figure 4:
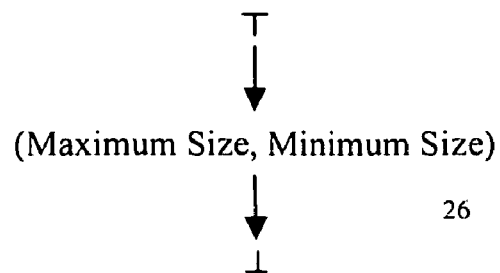
FIG. 4 shows an example of a data size lattice.
Figure 5:
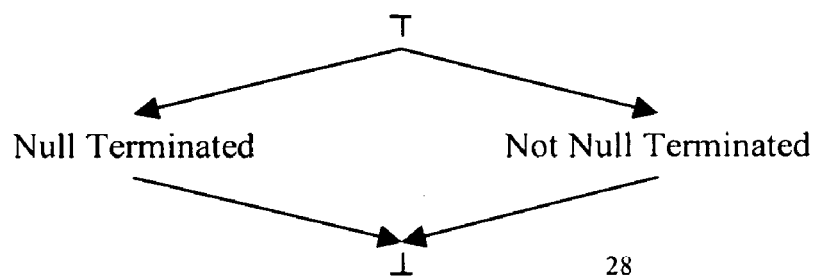
FIG. 5 shows an example of a null terminated lattice.

FIG. 4 depicts an example of a data size lattice 26. A data size lattice indicates the possible range of sizes of the known data within a block of memory, either directly or referenced via a pointer. This lattice may be used to determine if certain memory operations will overflow the available memory. In particular, it is generally used to indicate the size of a null terminated string, which may be shorter than the block of memory in which it is contained. The merge rules for the data size lattice 26 are as follows:
    a merge of a high value ($\top$) and any other value will result in the other value;
    a merge of a low value ($\bot$) and any other value will result in a low value; and
    a merge of two memory range lattice values will result in the following:
        range maximum←range$_1$ maximum⌈range$_2$ maximum
        range minimum←range$_1$ minimum⌊range$_2$ minimum FIG. 5 depicts an example of a null terminated lattice 28. A null terminated lattice indicates whether or not the data is known to be null terminated, e.g., has a 0 value as the last entry to indicate the end of the data. It is typically used in connection with string structures. The range of data includes specifying that it is null terminated or is not null terminated. The merge rules for the null terminated lattice are as follows:
    a merge of a high value ($\top$) and any other value will result in the other value;
    a merge of a low value ($\bot$) and any other value will result in a low value;
    a merge of two identical non-high, non-low lattice values will result in the same lattice value; and a merge of two different non-high, non-low lattice values will result in the low (⊥) lattice value.

Figure 6:
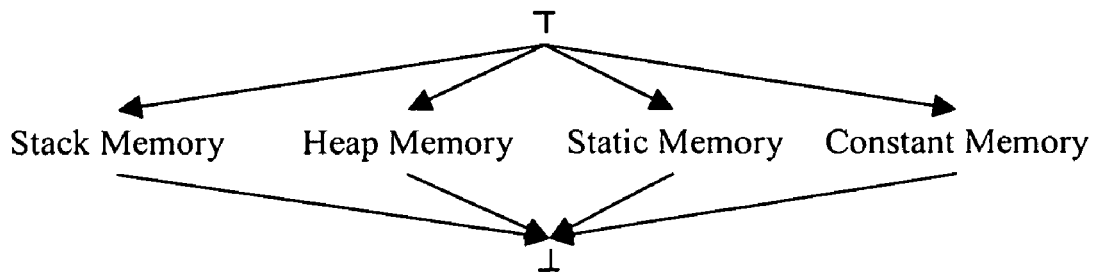
FIG. 6 shows an example of a memory location lattice.

FIG. 6 depicts an example of a memory location lattice 30. A memory location lattice indicates the kind of memory that the block of memory is contained within, e.g., stack memory, heap memory, static memory, and constant memory. Other kinds of memory may also be specified. The merge rules for the memory location lattice 30 are as follows:
- a merge of a high value (⊤) and any other value will result in the other value;
- a merge of a low value (⊥) and any other value will result in a low value;
- a merge of two identical non-high, non-low lattice values will result in the same lattice value; and
- a merge of two different non-high, non-low lattice values will result in the low (⊥) lattice value.

Figure 7:
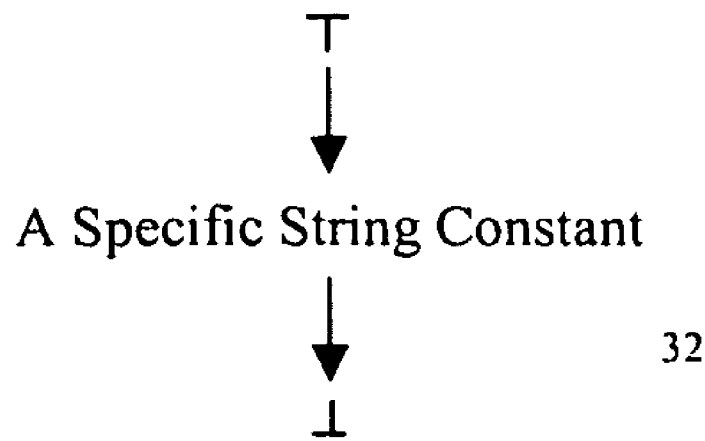
FIG. 7 shows an example of a string value lattice.

FIG. 7 depicts an example of a string value lattice 32. A string value lattice indicates the constant string value or values for the block of memory. The merge rules for a string value lattice are as follows:
- a merge of a high value (⊤) and any other value will result in the other value;
- a merge of a low value (⊥) and any other value will result in a low value;
- a merge of two identical constant strings will result in that constant string as the lattice value; and
- a merge of two different constant strings will result in the low (⊥) lattice value.

Figure 8:
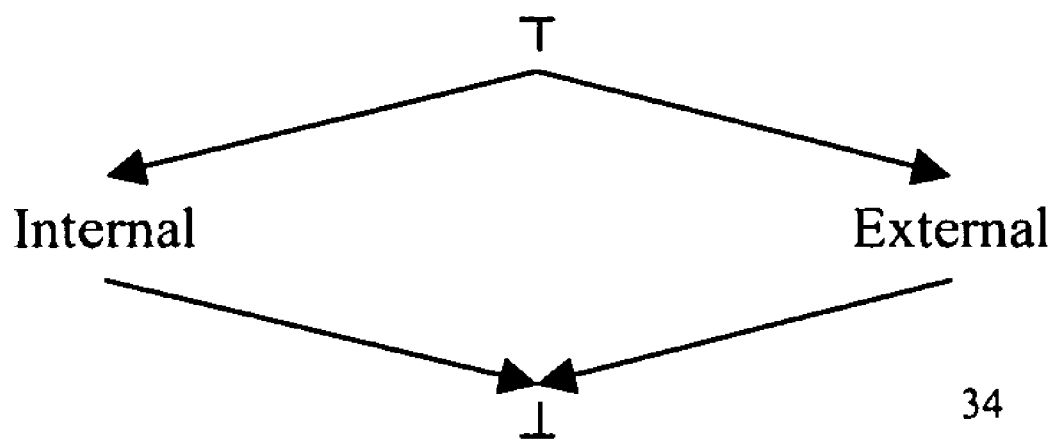
FIG. 8 shows an example of a data origin lattice.

FIG. 8 depicts an example of a data origin lattice 34. A data origin lattice indicates the origin of the data, e.g., specifying that the data is internally generated (relative to the analyzed routine) or whether it is externally generated. Data of an unknown origin will have the low value. The merge rules for a data origin lattice are as follows:
- a merge of a high value (⊤) and any other value will result in the other value;
- a merge of a low value (⊥) and any other value will result in a low value;
- a merge of two identical non-high, non-low lattice values will result in the same lattice value; and
- a merge of two different non-high, non-low lattice values will result in the low (⊥) lattice value.

A "vulnerability lattice" represents the attributes of a non-integral type variable (or expression). Under preferred embodiments, it incorporates the memory size lattice 24, data size lattice 26, null terminated lattice 28, memory location lattice 30, string value lattice 32, and data origin lattice 34.

Figure 9:
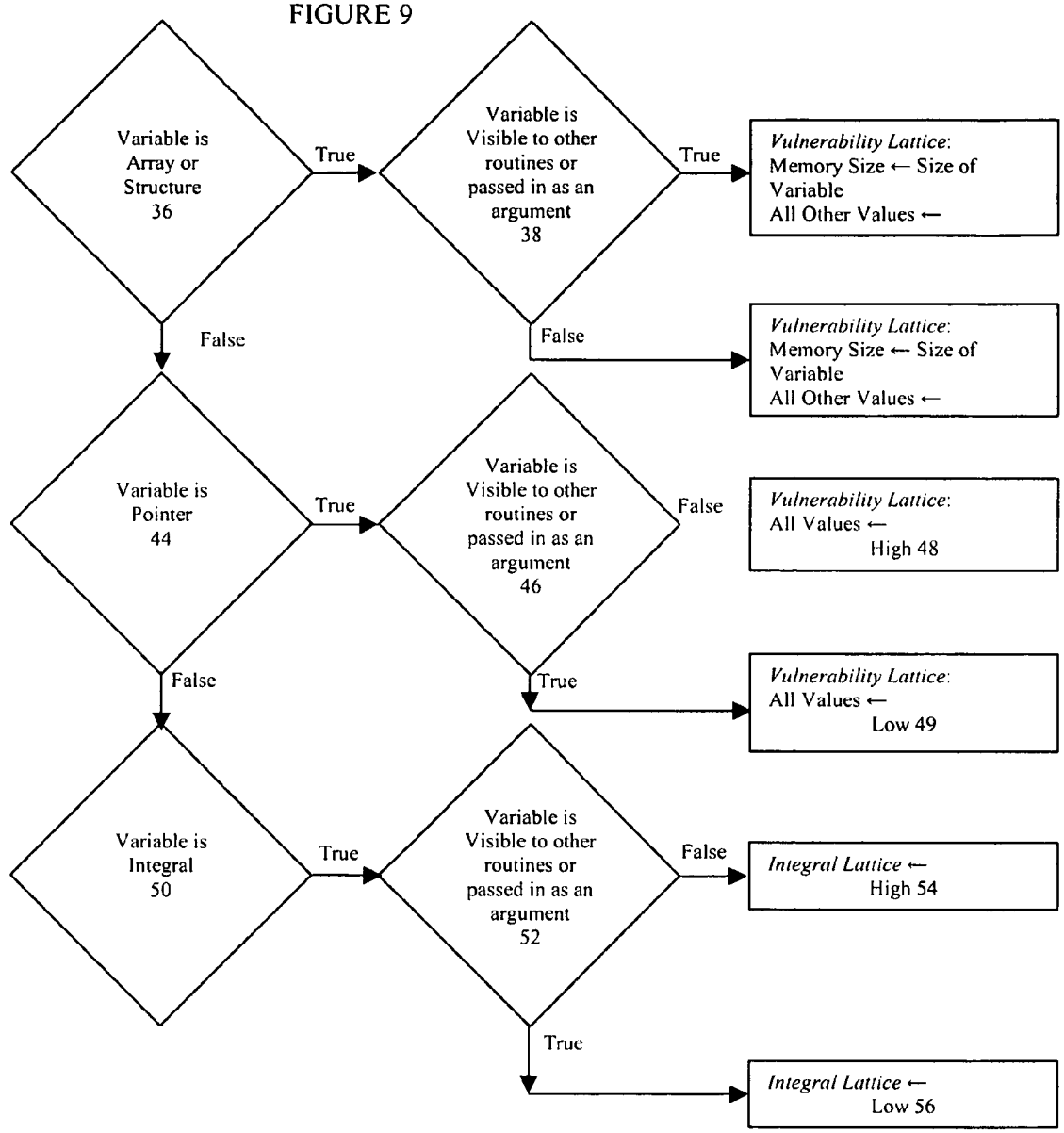
FIG. 9 shows a flow chart of the steps performed by the Flow-Insensitive Analysis according to one embodiment of the present invention.

FIG. 9 shows a flow chart of the steps performed in the flow-insensitive analysis 14 of preferred embodiments of the invention. The flow-insensitive analysis 14 derives a vulnerability lattice for each non-integral type variable or expression and an integral lattice for each integral type variable or expression. The term expression lattice, as used herein, means either a vulnerability lattice, in the case of a non-integral variable or expression or an integral lattice, in the case of an integral type variable or expression.

The flow begins with an initial test 36 to determine if the variable being analyzed is an array or structure. If so, the variable is associated with a vulnerability lattice. A test is then made in step 38 to determine if the variable is visible to other routines or passed into other routines as an argument.

If the variable is visible to other routines or passed into other routines as an argument, the vulnerability lattice for the variable is set, in step 40, to specify a memory size lattice having a value set to the size of the variable. All other values of the vulnerability lattice are set to low in step 40. Though not shown in the flow chart, if the variable is a constant initialized variable, the data size lattice, null terminated lattice, and string value lattice are set to indicate the initialized value of the variable.

If the variable is not visible to other routines or not passed into other routines as an argument, the memory size lattice is set to a value the size of the variable. All other values in the vulnerability lattice are set, in step 42, to high.

If the results of step 36 are "false" (meaning that the variable is not an array or structure), the flow proceeds to step 44. In step 44, a test is performed to determine whether the variable being analyzed is a pointer. If so, the logic proceeds to step 46 to determine if the pointer variable is visible to other routines, or if it is passed in to other routines as an argument.

If the variable is visible to other routines or passed into other routines as an argument, the pointer variable is associated with a vulnerability lattice and all values of the vulnerability lattice are set to low in step 49.

If the variable is not visible to other routines or not passed into other routines as an argument, the pointer variable is associated with a vulnerability lattice and all values of the vulnerability lattice are set to high in step 48.

If the results of step 44 are "false" (meaning that the variable is not an array or structure or pointer), the flow proceeds to step 50. In step 50 a test is performed to determine whether the variable being analyzed is an integral type variable. Integral type variables are associated with an integral lattice. If so, the logic proceeds to step 52 to determine if the integral variable is visible to other routines, or if it is passed in to other routines as an argument.

If the variable is visible to other routines or passed into other routines as an argument, it is associated with an integral lattice with all values set to low in step 56.

If the variable is not visible to other routines or not passed into other routines as an argument, the value in the integral lattice is set to high in step 54.

After the flow-insensitive analysis 14 derives a vulnerability lattice or integral lattice for each variable in the routine, the flow-insensitive analysis 14 visits each statement in the routine. The visits may be made in any order. Each expression within a statement is visited in such an order that before the expression is processed, all the expressions given as input (i.e., dependencies) to that expression are processed. For example, in the expression $$a=(b+c)+d;$$

the partial, or sub-expressions b and c must be processed before the expression (b+c) is processed. Similarly, the sub-expressions (b+c) and d must be processed before the expression (b+c)+d is processed.

Figure 10A:
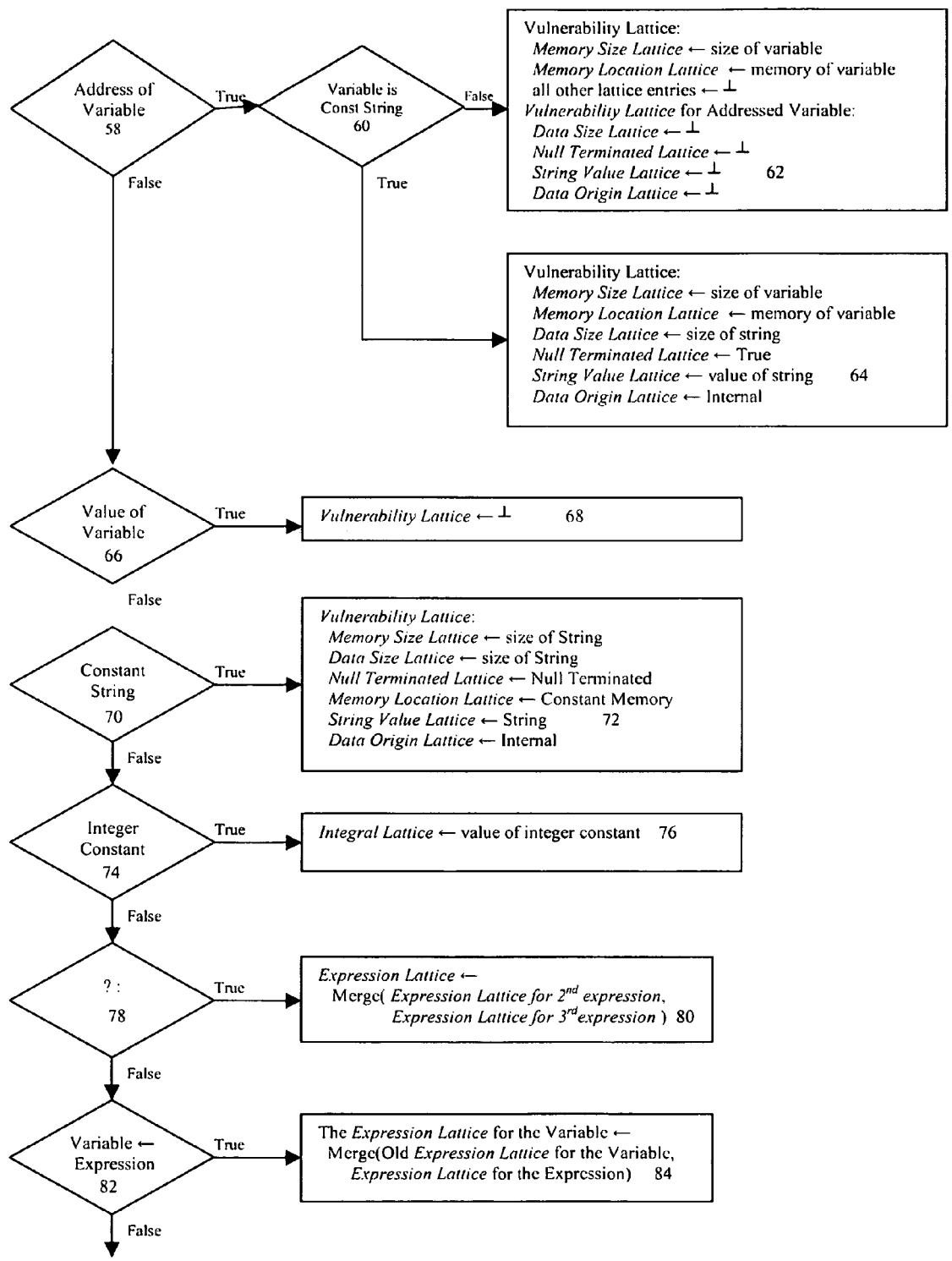
FIGS. 10A-B shows a flow chart of the steps performed in processing expressions according to the Flow-Insensitive Analysis of one embodiment of the invention.
Figure 10B:
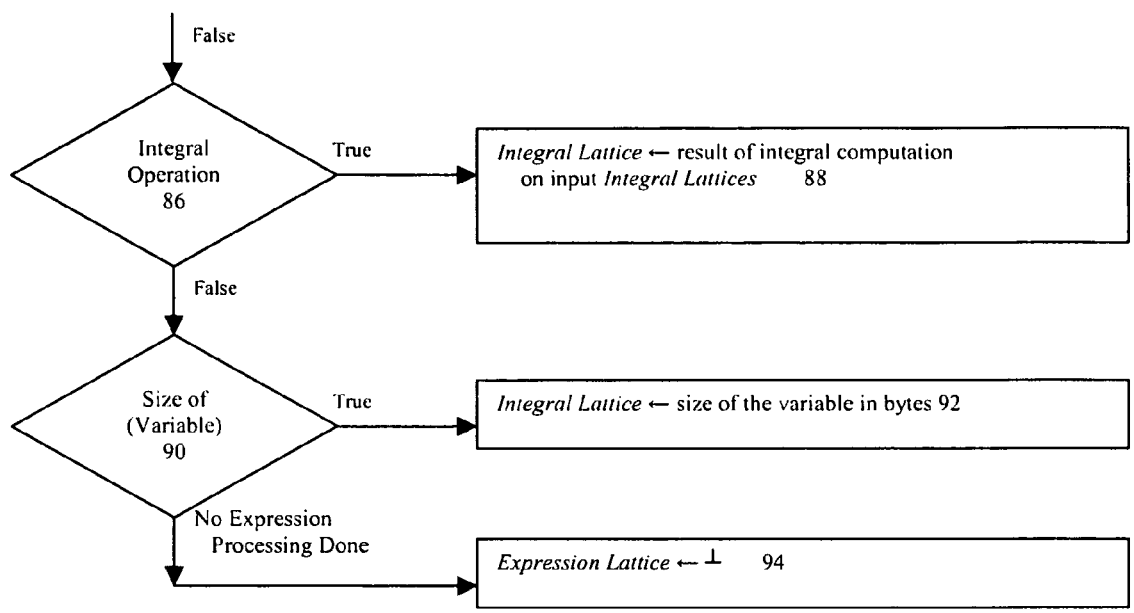

FIGS. 10A-B show a flow chart of the flow-insensitive analysis logic of preferred embodiments for processing each expression in a routine. The flow begins with an initial test 58 to determine if the expression being analyzed is for an address of a variable. If so, in step 60, a test is made to determine if that variable is to an array or structure or to determine if the variable is a constant string. If so, in step 64, a vulnerability lattice is associated with that expression and its memory size lattice is set to the size of the variable, and its memory location lattice is set to the kind of memory of the variable referenced. If the variable has a constant (const) attribute and it is a string, the data size lattice is set to the size of the string and the null terminated lattice is set to null terminated. The string value lattice is set to the value of the string. The data origin lattice is set to specify that the data origin is internal. If the expression is referring to the address of a variable but the variable is not a constant string, then in step 62 a vulnerability lattice is associated with that expression and its memory size lattice set to the size of the variable, and its memory location lattice is set to the kind of memory of the variable referenced. The other lattice entries are set to the low value. In addition, since the variable is address exposed (i.e., a pointer to it exists and it can potentially be modified by any pointer write to the pointer), in step 62 the vulnerability lattice whose address was taken has its data size lattice, null terminated lattice, string value lattice, and data origin lattice set to low (with the memory size lattice and memory location lattice remaining unchanged).

If the results of step 58 are "false" (meaning that the expression is not referring to the address of a variable), the flow proceeds to step 66. In step 66, a test is made to determine if the expression is for a value of a variable. If so, in step 68, a vulnerability lattice is associated with the expression and all lattice entries are set to low.

If the results of step 66 are "false" (meaning that the expression is not referring to the address or value of a variable), the flow proceeds to step 70. In step 70, a test is made to determine if the expression is for a constant string. If so, in step 72 a vulnerability lattice is associated with the expression and its memory size lattice is set to the size of the constant string, including null termination byte; its data size lattice is set to the size of the constant string, including the null termination byte; its null termination lattice is set to indicate that it is null terminated; its memory location lattice is set to indicate constant memory; its string value lattice is set to the contents of the string; and its data origin lattice is set to internal.

If the results of step 70 are "false" (meaning that the expression is not referring to the address or value of a variable and does not refer to a constant string), the flow proceeds to step 74. In step 74, a test is made to determine if the expression is for an integral constant (i.e., an integer). If so, in step 76 an integral lattice is associated with the expression, and its value is set to the integer value.

If the results of step 74 are "false" (meaning that the expression is not referring to the address or value of a variable and does not refer to a constant string or an integral constant), the flow proceeds to step 78. In step 78, a test is made to determine if the expression is a "question mark/colon operation." A question mark/colon operation is of the form <expression$_1$>?<expression$_2$>:<expression$_3$>. If so, in step 80 a vulnerability lattice is associated with the expression and its lattice entries are set to the results from merging the vulnerability lattices of <expression$_2$> and <expression$_3$> (which have been set previously).

If the results of step 78 are "false", the flow proceeds to step 82. In step 82, a test is made to determine if the expression is an assignment operation, i.e., assigning the expression to a variable. If so, in step 84 the expression lattice for the target variable (i.e., the one being assigned) is updated. Specifically, the prior values of the expression lattice are merged with the expression lattice for the expression being assigned to the target variable.

If the results of step 82 are "false", the flow proceeds to step 86. In step 86, a test is made to determine if the expression is for an integral operation. If so, in step 88 the integral value lattices for each input of the operation are used to compute a resulting integral lattice and value for the expression.

If the results of step 86 are "false", the flow proceeds to step 90. In step 90, a test is made to determine if the expression is for a "size of" operation, i.e., of the form size of (<variable or type>). If so, in step 92 an integral lattice is associated with the expression and its value will be the size of the variable (or type).

If the tests for steps 58, 66, 70, 74, 78, 82, 86, and 90 are false, then a default assignment is made in step 94 in which all values of the expression lattice are set to low.

The following examples are exemplary code segments to be analyzed by flow-insensitive analysis logic to determine whether a buffer flow vulnerability exists. Each is followed by a description of how the flow-insensitive analysis logic models the variables and expressions with the various lattices mentioned above.

Example 1

```
void test1(int i) {
    char buf[100];
    char *p;
    switch (i) {
        case 1:
            p = "1";
            break;
        case 2:
            p = "12";
            break;
        default:
            p = "123";
            break;
    }
    strcpy(buf, p);
}
void test1(int i) {
```

An integral lattice for the variable i is created because its declared of "int" type and its integral lattice values are set to low: i← ⊥ char buf[100];

A vulnerability lattice is associated with the variable "buf" and because it's an array its memory size lattice is set to the size of the structure: buf←100. Since this variable is local and not visible to other routines or passed as an argument, all other lattices are set high: ← ⊤, see step 42 of FIG. 9.

char *p;

A vulnerability lattice is associated with the variable p. Because it is a pointer and it is not visible to other routines or passed as an argument all lattices are set high: ← ⊤, see step 48 of FIG. 9.

switch (i) {

The integral lattice for "i" has the value ⊥, see above.

case 1:

p="1";

This is an assignment operation and thus will trigger the logic of steps 82 and 84 of FIGS. 10A-B. Consequently, the expression lattice for the variable being assigned will be the merge results of the prior value of the lattice for the variable (in this case high ⊤) and the expression lattice for the expression being assigned to the variable, in this case the expression "1". The expression "1" has the lattice:

memory size lattice ← 2
data size lattice ← 2
null terminated lattice ← null terminated
memory location lattice ← constant memory
data origin lattice ← internal
string value lattice ← "1"

The results of the merger rules are used for the vulnerability lattice for p and are as follows:

```
memory size lattice ← 2
data size lattice ← 2
null terminated lattice ← null terminated
memory location lattice ← constant memory
data origin lattice ← internal
string value lattice ← "1"
    break;
case 2:
    p = "12";
```

This too is an assignment operation and thus will trigger the logic of steps 82 and 84 of FIGS. 10A-B. Consequently, the expression lattice for the variable being assigned will be the merge results of the prior value of the lattice for the variable (see above) and the expression lattice for the expression being assigned to the variable, in this case the expression "12". The expression "12" has the lattice

```
memory size lattice ← 3
data size lattice ← 3
null terminated lattice ← null terminated
memory location lattice ← constant memory
data origin lattice ← internal
string value lattice ← "12"
```

The results of the merger rules are used for the vulnerability lattice for p and are as follows:

```
memory size lattice ← range of 2 to 3
data size lattice ← range of 2 to 3
null terminated lattice ← null terminated
memory location lattice ← constant memory
data origin lattice ← internal
string value lattice ← ⊥
    break;
default:
    p = "123";
```

This too is an assignment operation and thus will trigger the logic of steps 82 and 84 of FIGS. 10A-B. Consequently, the expression lattice for the variable being assigned will be the merge results of the prior value of the lattice for the variable (see above) and the expression lattice for the expression being assigned to the variable, in this case the expression "123". The expression "123" has the lattice

```
memory size lattice ← 4
data size lattice ← 4
null terminated lattice ← null terminated
memory location lattice ← constant memory
data origin lattice ← internal
string value lattice ← "123"
```

The results of the merger rules are used for the vulnerability lattice for p and are as follows:

```
memory size lattice ← range of 2 to 4
data size lattice ← range of 2 to 4
null terminated lattice ← null terminated
memory location lattice ← constant memory
data origin lattice ← internal
```

```
    string value lattice ← ⊥
    break;
}
strcpy(buf, p);
```

Since the address of buf is implicitly taken for the argument, the logic of step 62 is triggered and the vulnerability lattice for buf is modified to set the data size lattice, memory size lattice, string value lattice and data origin lattice to unknown.

Since the expression p refers to the value of a variable, the logic of step 68 is triggered and all values in the vulnerability lattice of the expression p are set to unknown.

Example 2

```
static char y[100];
void test2(char *z) {
    strcpy(y, z);
}
static char y[100];
```

A vulnerability lattice is associated with array y. Its memory size is set to 100, its memory kind lattice is set to static, and all other lattices are set low: ←⊥ This is done because the variable y is visible to other routines, see step 40 of FIG. 9.

void test2(char *z) {

A vulnerability lattice is associated with pointer variable z. All lattices are set low: ←⊤. This is done because the variable z is passed to other routines as an argument, see step 49 of FIG. 9.

strcpy(y, z);

Since the address of y is implicitly taken for the argument, the logic of step 62 is triggered and the vulnerability lattice for y is modified to set the data size lattice, memory size lattice, string value lattice and data origin lattice to unknown.

Since the expression z refers to the value of a variable, the logic of step 68 is triggered and all values in the vulnerability lattice of the expression z are set to unknown.

After the flow insensitive analysis is performed, the call site analysis logic 16 is invoked. The call site analysis 16 derives vulnerability lattices for each variable or expression argument passed at a call site within the routine being analyzed. (A "call site" is the location within the code where a call is made to a routine.) The arguments may be variables or expressions. Under preferred embodiments, the call site analysis is limited to calls to only select routines, procedures, or functions, as not all routines pose a vulnerability risk.

Under preferred embodiments, the call site analysis 16 requires that each call site be visited; however, this need not be in any specific order. Each argument of the call is analyzed such that any subexpression dependencies are processed first; that is, for example, before an expression making up an argument is processed, all the subexpressions given as input to that expression are processed.

The call site analysis logic is similar to the flow-insensitive analysis logic. However, unlike the flow-insensitive analysis logic, in the call site analysis logic any expression referring to the value of a variable associates the vulnerability lattice for that variable with the expression making such reference. In addition, any assignment operation to a variable does not change the vulnerability lattice for that variable.

Figure 11A:
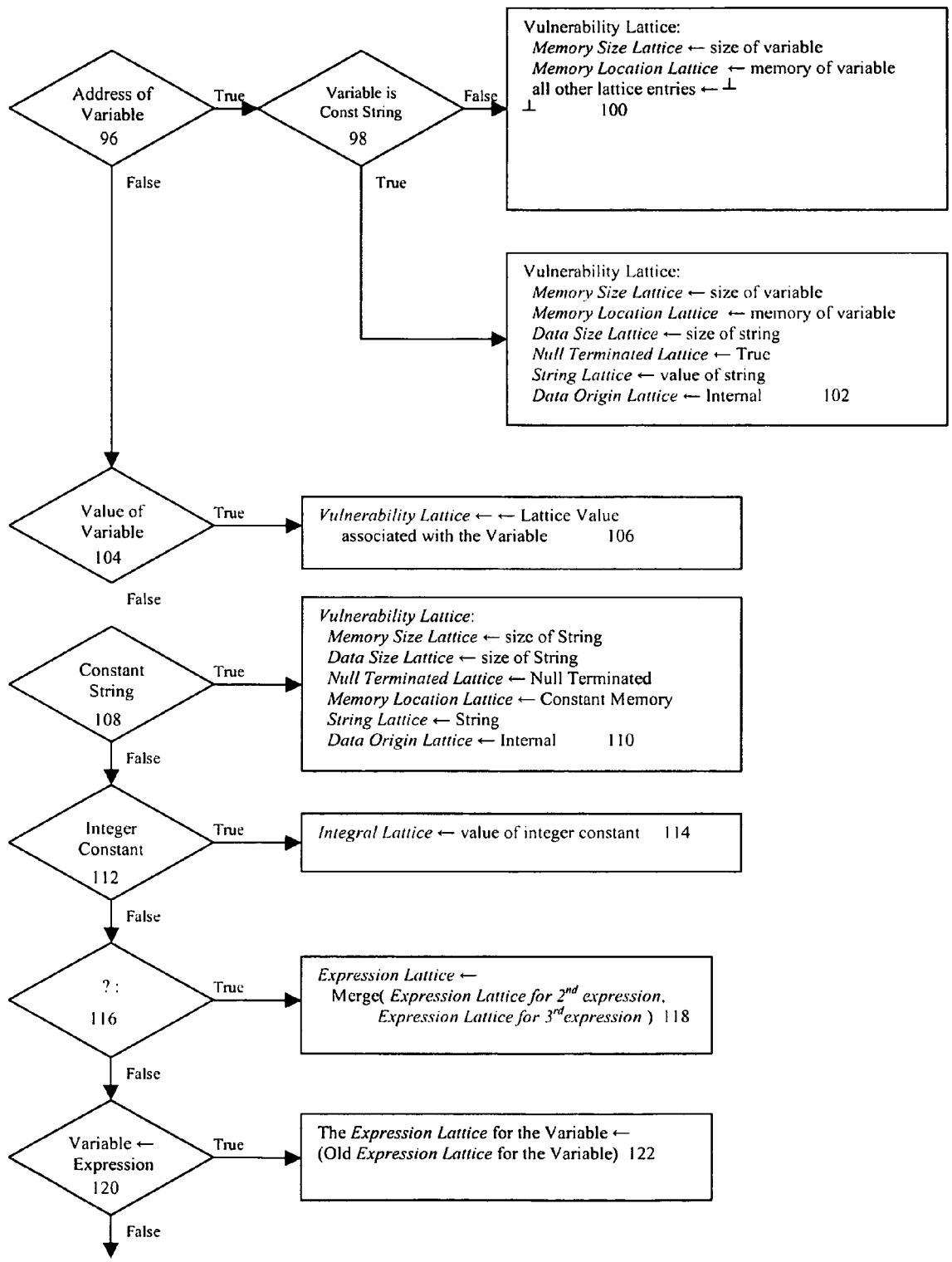
FIGS. 11A-B shows a flow chart of the steps performed in processing expressions according to the Call Site Analysis according to one embodiment of the present invention.
Figure 11B:
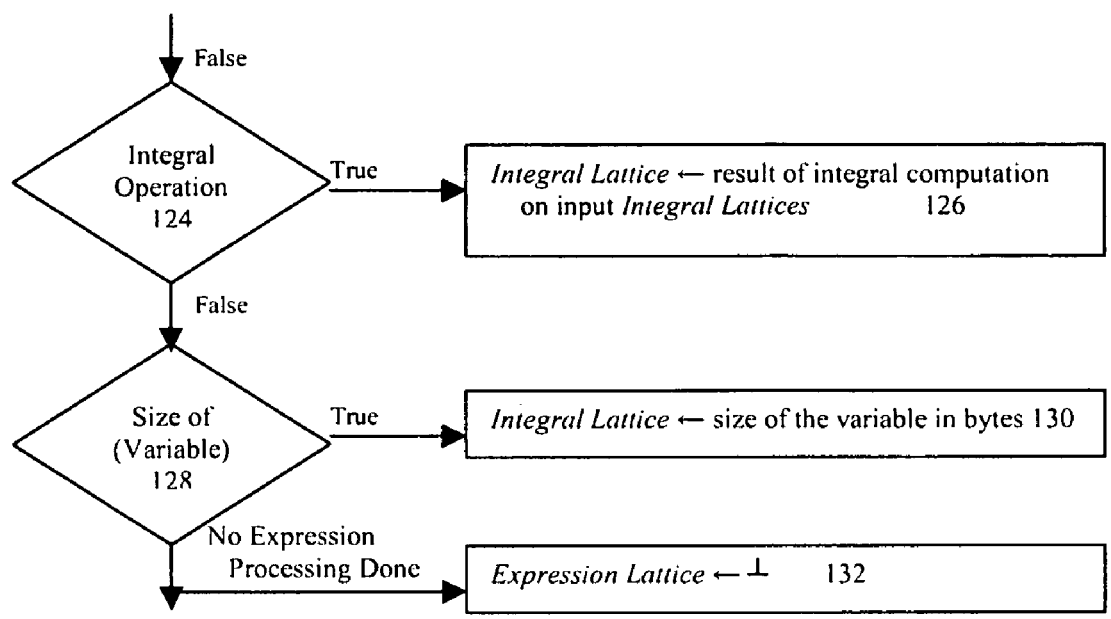

FIGS. 11A-B show a flow chart of the steps performed in analyzing expressions in the call site analysis 16. The flow begins with an initial test 96 to determine if the expression being analyzed is for an address of a variable. If so, in step 98, a test is made to determine if that variable is to an array or structure or to determine if the variable is a constant string. If so, in step 102, a vulnerability lattice is associated with that expression and its memory size lattice is set to the size of the variable, and its memory location lattice is set to the kind of memory of the variable referenced. If the variable has a constant (const) attribute and it is a string, the data size lattice is set to the size of the string and the null terminated lattice is set to null terminated. The string value lattice is set to the value of the string. The data origin lattice is set to specify that the data origin is internal. If the expression is referring to the address of a variable but the variable is not a constant string, then in step 100 a vulnerability lattice is associated with that expression and its memory size lattice set to the size of the variable, and its memory location lattice is set to the kind of memory of the variable referenced. The other lattice entries are set to the low value.

If the results of step 96 are "false", the flow proceeds to step 104. In step 104, a test is made to determine if the expression is for a value of a variable. If so, in step 106, a vulnerability lattice is associated with the expression and all lattice entries are set to lattice values associated with the variable.

If the results of step 104 are "false", the flow proceeds to step 108. In step 108, a test is made to determine if the expression is for a constant string. If so, in step 110 a vulnerability lattice is associated with the expression and its memory size lattice is set to the size of the constant string, including null termination byte; its data size lattice is set to the size of the constant string, including the null termination byte; its null termination lattice is set to indicate that it is null terminated; its memory location lattice is set to indicate constant memory; its string value lattice is set to the contents of the string; and its data origin lattice is set to internal.

If the results of step 108 are "false", the flow proceeds to step 112. In step 112, a test is made to determine if the expression is for an integral constant (i.e., an integer). If so, in step 114 an integral lattice is associated with the expression, and its value is set to the integer value.

If the results of step 112 are "false", the flow proceeds to step 116. In step 116, a test is made to determine if the expression is a "question mark/colon operation." If so, in step 118 a vulnerability lattice is associated with the expression and its lattice entries are set to the results from merging the vulnerability lattices of <expression$_2$> and <expression$_3$> (which have been set previously).

If the results of step 116 are "false", the flow proceeds to step 120. In step 120, a test is made to determine if the expression is an assignment operation, i.e., assigning the expression to a variable. If so, in step 122 the expression lattice for the target variable (i.e., the one being assigned) remains the same as the prior expression lattice for the variable.

If the results of step 120 are "false", the flow proceeds to step 124. In step 124, a test is made to determine if the expression is for an integral operation. If so, in step 126 the integral value lattices for each input of the operation are used to compute a resulting integral lattice and value for the expression.

If the results of step 124 are "false", the flow proceeds to step 128. In step 128, a test is made to determine if the expression is for a "size of" operation. If so, in step 130 an integral lattice is associated with the expression and its value will be the size of the variable (or type).

If the tests for steps 96, 104, 108, 112, 116, 120, 124, and 128 are false, then a default assignment is made in step 94 in which all values of the expression lattice are set to low.

Referring back to the exemplary code segments analyzed in connection with the flow-insensitive analysis logic, the following processing takes place.

Example 1

```
void test1(int i) {
    char buf[100];
    char *p;
    switch (i) {
        case 1:
            p = "1";
            break;
        case 2:
            p = "12";
            break;
        default:
            p = "123";
            break;
    }
    strcpy(buf, p);
}
```

The call to strcpy has its arguments analyzed for lattice values. Argument 1 has the value buf, which has the vulnerability lattice values as follows:

Memory Size Lattice ← 100,
Data Size Lattice ← ⊥
Null Terminated Lattice ← ⊥
String Value Lattice ← ⊥
Memory Location Lattice ← Stack Memory
Data Origin Lattice ← ⊥

Argument 2 has the value p, which has the vulnerability lattice values as follows:

Memory Size Lattice ← range of 2 to 4
Data Size Lattice ← range of 2 to 4
Null Terminated Lattice ← Null Terminated
String Value Lattice ← ⊥
Memory Location Lattice ← Constant Memory
Data Origin Lattice ← Internal
}

Example 2

```
static char y[100];
void test2(char *z) {
    strcpy(y, z);
}
```

This call to strcpy has its arguments analyzed for lattice values. Argument 1 has the value y, which has vulnerability lattice values as follows:

> Memory Size Lattice ← 100,
> Data Size Lattice ← ⊥
> Null Terminated Lattice ← ⊥
> String Value Lattice ← ⊥
> Memory Location Lattice ← Static Memory
> Data Origin Lattice ← ⊥

Argument 2 has the value z, which has vulnerability lattice values as follows:

> Memory Size Lattice ← ⊥
> Data Size Lattice ← ⊥
> Null Terminated Lattice ← ⊥
> String Value Lattice ← ⊥
> Memory Location Lattice ← ⊥
> Data Origin Lattice ← ⊥
> }

According to one embodiment of the invention, the vulnerability lattices are created for those arguments to library call sites that are known to have potential vulnerabilities. The library call sites may be identified in a database 20.

Language Independent Analysis of Vulnerability Lattices at Select Call Sites Once the vulnerability lattices are created for the arguments to select routine calls, the source code is further analyzed in a language independent manner to determine if the source code has vulnerabilities that should be reported. Preferred embodiments of the invention perform such analysis with vulnerability assessment logic 18 operating in conjunction with a vulnerability database 20.

The vulnerability database 20 is a database containing information about a number of pre-identified routines. Among other things, it specifies the conditions that can cause a vulnerability. The conditions are specified as constraints to a vulnerability lattice or arguments passed to the routine.

The vulnerability assessment logic 18 operates as follows. Each call site in the source code, as analyzed by call site analysis 16, is examined, though this need not be in any specific order. The name of the called routine, and possibly information about its argument types, is used to create a routine lookup name. This routine lookup name is used as a key in the vulnerability database 20 to discover if this call site is potentially vulnerable.

If the lookup fails to discover a corresponding entry, then the call site is determined to be not vulnerable, because the routine name has no known vulnerabilities specified in the database 20.

If the lookup discovers a corresponding entry, then the entry is examined for a list of matching actions, which are rules used to assess a specific call. Those matching actions are supplied in a specific order. Each matching action is compared to the vulnerability lattice for each argument to determine if the vulnerability lattice from the argument matches the requirement of the matching action. As illustrated in the example described below, if a match occurs, then the action reports a vulnerability for the examined call site. The report may then be used by a developer to address the potential vulnerability. Multiple vulnerabilities may be detected for a specific call site.

Referring back to the exemplary code segments analyzed in connection with the language specific processing logic, the following processing takes place in vulnerability assessment.

Example 1

This is the example which had the following language-specific code:

strcpy(buf, p);

The call site analysis for this call yielded the following vulnerability lattice for the first argument buf:

> Memory Size Lattice ← 100,
> Data Size Lattice ← ⊥
> Null Terminated Lattice ← ⊥
> String Value Lattice ← ⊥
> Memory Location Lattice ← Stack Memory
> Data Origin Lattice ← ⊥

The call site analysis also yielded the following vulnerability analysis for the second argument p:

> Memory Size Lattice ← range of 2 to 4
> Data Size Lattice ← range of 2 to 4
> Null Terminated Lattice ← Null Terminated
> String Value Lattice ← ⊥
> Memory Location Lattice ← Constant Memory
> Data Origin Lattice ← Internal The matching actions returned from the database 20 specify certain rules to be applied in assessing the vulnerability lattices for the call to routine strcpy( ). In the particular case of the call to strcpy the rules check that the first argument has a minimum memory size that is larger than or the same size as the maximum data size for the second argument. In this way, the rules (matching actions) determine whether this specific call creates a risk of buffer overflow. In this case, no overflow is possible given the effectively semantic analysis of the source code involved.

The minimum memory size for argument 1 (100) is greater than or equal to the maximum data size for argument 2 (4), so the buffer cannot overflow. The data origin for argument 2 is internal, so it cannot be a vulnerability. The call is not marked as a vulnerability.

Example 2

This is the example which had the following language-specific code:

strcpy(y, z);

The call site analysis for this call yielded the following vulnerability lattice for the first argument y:

> Memory Size Lattice ← 100,
> Data Size Lattice ← ⊥
> Null Terminated Lattice ← ⊥
> String Value Lattice ← ⊥
> Memory Location Lattice ← Static Memory
> Data Origin Lattice ← ⊥

The call site analysis also yielded the following vulnerability analysis for the second argument z:

```
Memory Size Lattice ← ⊥
Data Size Lattice ← ⊥
Null Terminated Lattice ← ⊥
String Value Lattice ← ⊥
Memory Location Lattice ← ⊥
Data Origin Lattice ← ⊥
```

The matching actions returned from the database 20 specify certain rules to be applied in assessing the vulnerability lattices for the call to routine strcpy( ). In the particular case of the call to strcpy the rules check that the maximum data size for the second argument is ⊥, and thus unknown. Thus, there is a possibility that the buffer can overflow. Likewise, the data origin of the second argument is ⊥, and thus unknown. Thus, there is a second possibility of a vulnerability. (If the input is unknown or external, there is the possibility of the size being too small or the input being not of internal origin which would produce a vulnerability.) In the particular case of the call to strcpy: the maximum data size for argument 2 is ⊥, so the buffer can overflow. The data origin for argument 2 is ⊥, so it can be a vulnerability. The call is marked as a vulnerability.

The embodiments described above are directed to a method of detecting buffer overflow vulnerabilities. As noted above, the method may be used to detect other vulnerabilities, such as race condition and privilege escalation.

Race Condition

As used herein, the term "race condition" means a pair of routine calls that happen sequentially in a program and which, if not performed atomically (i.e. without interruption by another thread or process on the machine), could become a vulnerability. A typical example is a call to determine the access rights of a file, and a subsequent call to write or read of that file based on the access. If the process is interrupted between the two calls and the file attributes are modified during the interruption, the second call may be reading the wrong information or writing to an inappropriate file.

The following is an exemplary code segment to be analyzed to determine whether a race condition exists. It uses access( ) and fopen( ) to illustrate a related pair of calls that could be vulnerable.

Example 3

```
... some code A ...
1) r = access( filename, ... )
... some code B ...
2) if( r ) then
    ... some code C ...
3) fopen( filename, ... )
... some code D ...
```

In this example, there is a call to access( ) for a particular filename, followed by a test of the return value from access( ). If the test succeeds, fopen( ) is called for the same filename. Placeholders are listed for arbitrary code that could happen around the numbered statements. The fopen( ) call is reachable from the access( ) call; which means that there are no other operations on the file between the two calls, and the fopen( ) call will follow the access( ) call if the test succeeds.

While this example shows the argument to access( ) and fopen( ) as a single variable name, it is possible that the argument could be any arbitrary expression such as filename_list[i] (an entry in an array of names), or fullpath+baselen (a pointer to a character string baselen characters into fullpath). The important point is that the runtime value of that argument is the same for both calls.

As in the embodiments described above for buffer overflow conditions, a lexical analyzer is used to generate an IR for the code to be analyzed for a race condition. In this embodiment, the IR includes information about declarations in the program, and records information about identifiers in the program such as their type. It can distinguish function declarations from function calls.

Figure 12:
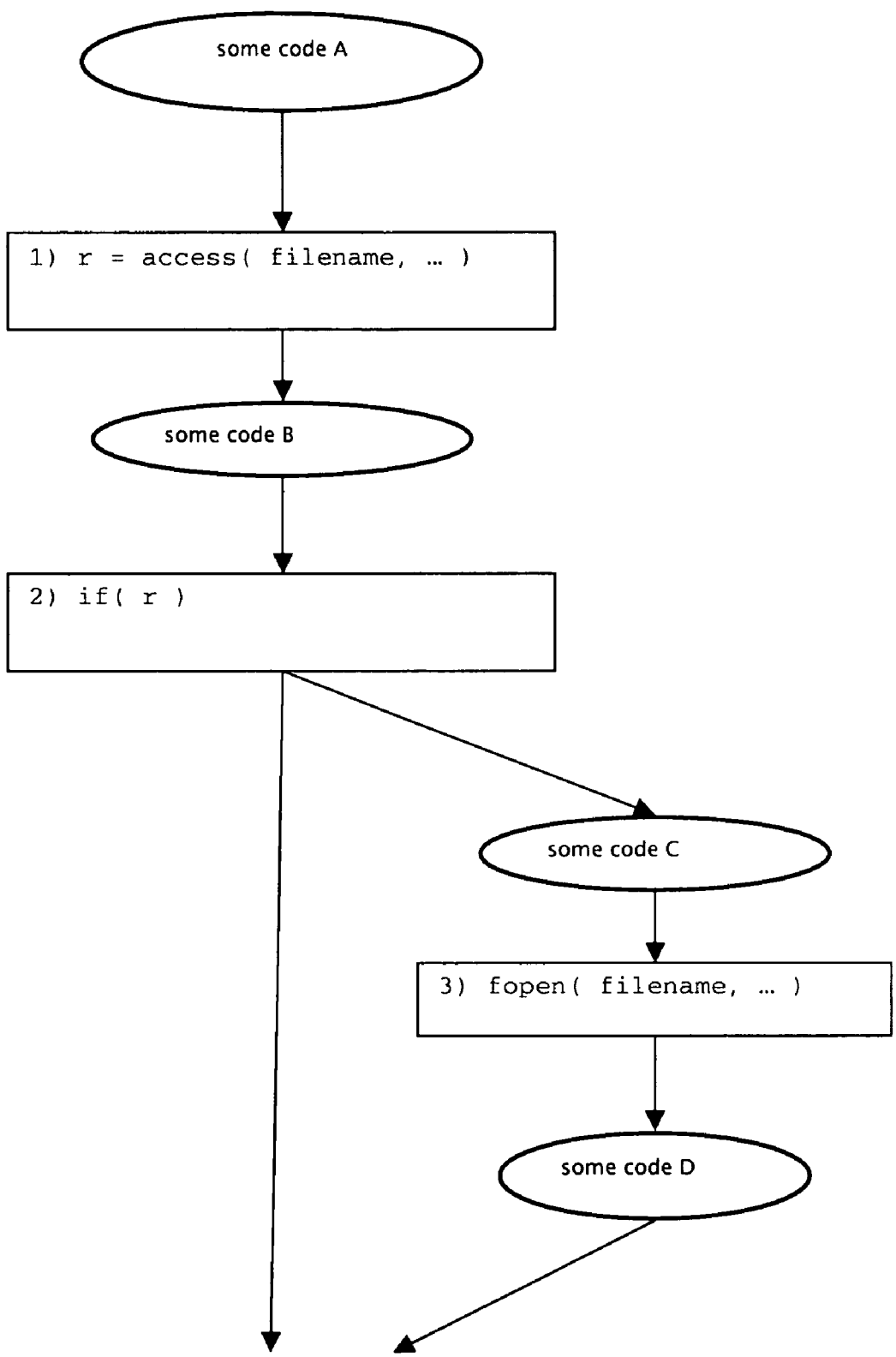
FIG. 12 shows a control flow graph according to one embodiment of the present invention.

A control flow graph is provided to show the basic block structure and the branches between the blocks which determine program control flow. An example of a control flow graph is shown in FIG. 12. The rectangular entities 140 are basic blocks (contiguous, straight line statements with no branching, representing "if", "while", etc.); ovals 142 are regions of code with arbitrary control flow inside; and arrows 144 represent control flow between basic blocks or code regions.

Using the control flow graph, the system traverses backward from the block containing the open( ) call through the blocks preceding it. In the example shown, it goes to the block containing the call to access ( ) and notes that the access( ) call precedes the open( ) call. Knowing that the calls are related, it examines the argument list of each call, focusing on the arguments corresponding to the filename. As a heuristic, it compares the structure of the corresponding expressions. In this example, it would find that both expressions are references to the same variable, and it would conclude that the two calls are referencing the same file and as a result, a race condition vulnerability would be flagged.

In another embodiment of a system for detecting race condition vulnerability, data flow analysis could be used with the system described above in order to provide information about the value of variables at different points in the program. For example, it could determine whether the variable filename had the same value in both the access( ) call and the fopen( ) call). Data flow analysis could also be used to determine whether an argument to access( ) described as fullpath+baselen, had the same value as an argument to fopen( ) described as filename.

Privilege Escalation

Privilege escalation vulnerabilities can arise when an application with a high level of system privileges can be made to perform actions outside of the intended design, allowing an outside party to gain privileged access to the system that they would not otherwise posses.

The following is an exemplary code segment for detection of privilege escalation.

Example 4

```
void somefunc( ){
  ... SetSecurityDescriptorDacl( &descriptor, TRUE,
      NULL/* ACL*/, FALSE);
}
```

In this example, a Windows API call sets security attributes for a resource. The vulnerability is that a resource's ACL (access control list) should never be set to null because the resource would then be accessible or modifiable by an unauthorized user.

As in the embodiments described above, a language parser is used to create an IR from the source code. The IR provides a symbol table which includes information for all types, constants, variables and functions declared in the file. The information for function 'somefunc' includes a reference to the statements of 'somefunc.' Statements of the IR include the control flow statements of the applicable language ("if," "while," "for," etc. in C or C++) and expressions (including assignment, function calls, arithmetic operations, etc.). Function call information includes a symbol table entry for the routine being called, and a list of expressions corresponding to the arguments. A database of possible vulnerable calls is provided.

The IR is traversed, with each function definition and statement within that definition being visited. The routine being called at function call node is matched against the database information. When there is a match, the function call is looked at in greater detail.

The particular conditions which make a particular call vulnerable are previously determined. In the example shown above, it is known that that the potential issue is that the third argument to SetSecurityDescriptonDacl( ) should not be NULL. The IR for this call would point to SetSecurityDescriptorDacl as the routine being called, and there would be four entries in the list of expressions for arguments. The first would be the address of the variable 'descriptor', and the last three would be the IR constants for TRUE, NULL, and FALSE.

Finding a match with SetSecurityDescriptorDacl would trigger a deeper examination of the arguments to the call. In this case, knowledge about SetSecurityDescriptorDacl's potential vulnerability would cause an examination of the third argument. The IR directly describes this as NULL, and this call site would be flagged as vulnerable.

As described above, preferred embodiments of the invention analyze certain semantic characteristics of the source code itself to determine whether a vulnerability potentially exists. For example, arguments to a routine may be algorithmically analyzed in view of some known behavior about the routine (e.g., that a routine copies one argument to a buffer pointed to by another argument) to detect problematic calls. This approach avoids the many false positives found in known prior art approaches and proposals.

To date, security experts analyzed code using known rules to look for vulnerabilities but this was labor intensive and error prone. The invention automates the semantic analysis for vulnerabilities such as buffer overflow, race condition and privilege escalation. It also provides a framework so that as other vulnerabilities get discovered the matching actions for the detection of such may be specified and incorporated into the preferred system.

In the embodiment described above, the source code is (a) all or part of the text for an executable program written in the ANSI C language as described in the ANSI Standard X3J11, and with commonly used extensions, such as those provided by the Microsoft and GNU compiler; or (b) all or part of the text for an executable program written in the ANSI C++ language as described in the ANSI Standard X3J16, and with commonly used extensions, such as those provided by the Microsoft and GNU compilers. It is understood, however, that the invention may be used to analyze source code written in other languages as well.

While the invention has been described in connection with certain preferred embodiments, it will be understood that it is not intended to limit the invention to those particular embodiments. On the contrary, it is intended to cover all alternatives, modifications and equivalents as may be included in the appended claims. Some specific figures and source code languages are mentioned, but it is to be understood that such figures and languages are, however, given as examples only and are not intended to limit the scope of this invention in any manner.

Interprocedural Vulnerability Analysis (IPVA)

Overview

The purpose of Interprocedural Vulnerability Analysis (IPVA) is to more accurately assess vulnerabilities in the source code through the use of analysis that spans more than the information available to a single routine. An analysis that uses information that spans more than one routine is termed interprocedural analysis. (Compiler technology performs a form of interprocedural analysis and has developed techniques for traversing through and modeling call graphs; however compilers generally use this technique for code generation, not security analysis.)

Figure 14:
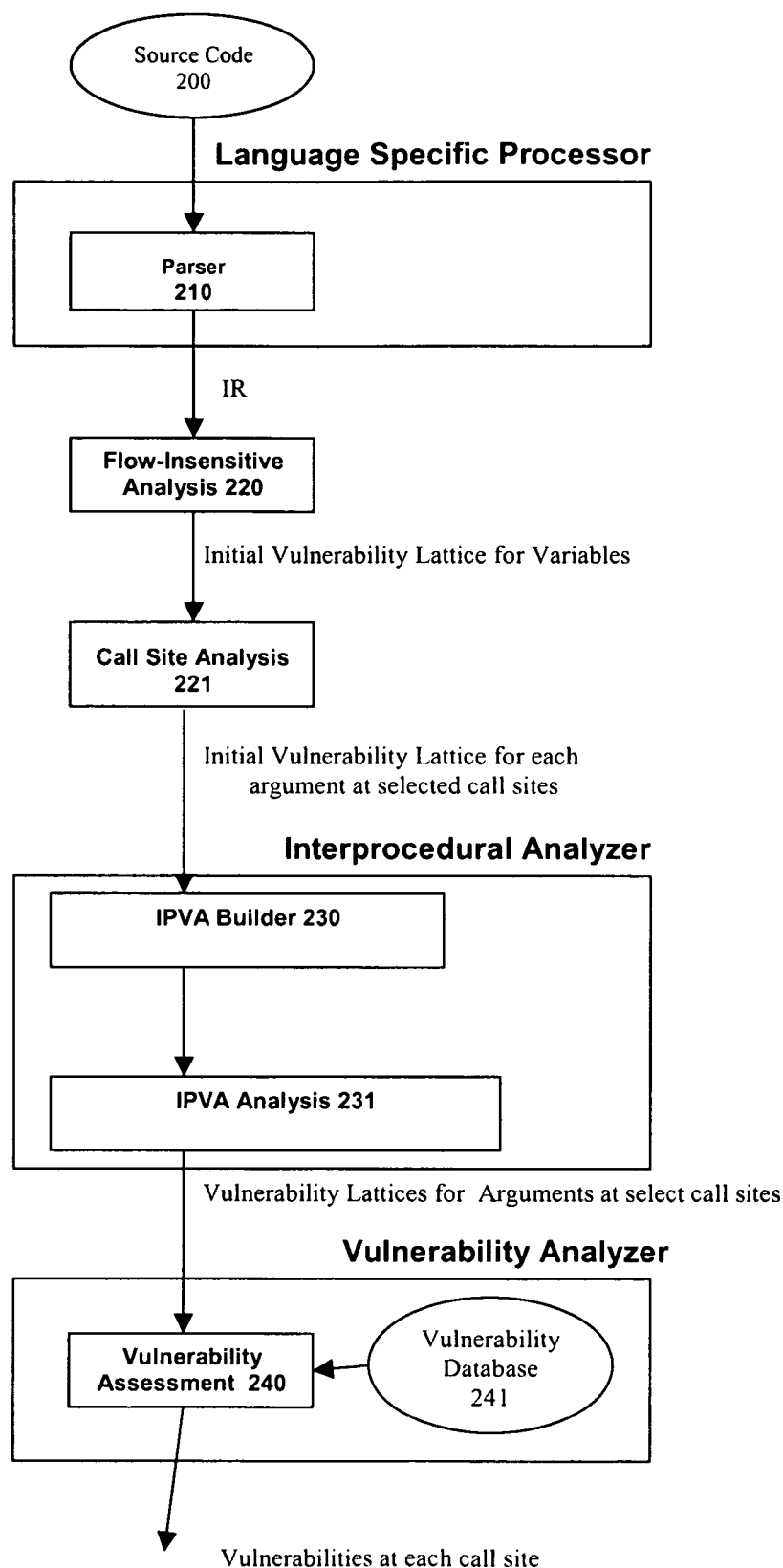
FIG. 14 shows a flow chart of the steps of the system and method of one embodiment of the present invention including Interprocedural Analysis.

Modeling the source code and iterating through a call graph to model interprocedural effects can be computationally expensive and potentially intractable from a realistic viewpoint unless performed in an intelligent way. IPVA uses an Interprocedural Analyzer (FIG. 14) to perform interprocedural analysis. The Interprocedural Analyzer (FIG. 14) has two main components—IPVA Builder 230, and IPVA Analysis 231. IPVA Builder 230 builds the data structures required to perform interprocedural analysis. In short, it attempts to model assignment operations and calls. IPVA Analysis 231 uses these data structures to perform the actual analysis. In short, it iterates through a call graph model of the larger program in an intelligent and efficient way to model the interprocedural effects of various parameters and arguments.

It is anticipated that by using IPVA the vulnerability lattices used to model arguments to routine calls and the like will be more precise, yielding fewer false positive results and more accurate vulnerability analysis.

Building Interprocedural Data Structures

IPVA Builder 230 takes as input the initial vulnerability lattices derived by Flow-Insensitive Analysis 220 and Call Site Analysis 221 and the IR created by Parser 210 to create a representation of routines, and operations in those routines. The operations reference the initial vulnerability lattices. More detailed description of these data structures is given below. In addition, IPVA Builder 230 constructs a call graph, which may consist of multiple unconnected regions. In other words, there may be multiple call graphs that don't connect, because IPVA Builder 230 may only see part of the total program's call graph. The call graph is used to propagate information about the values up and down paths within the call graph, potentially propagating information about external inputs, block sizes, and other information from place to place. IPVA Builder 230 sorts the call graph and discovers the roots of the call graph. The roots are routines that are starting points for traversing the call graph. They are routines with no callers.

Performing Interprocedural Analysis

IPVA Analysis 231 uses the call graph and data structures produced by IPVA Builder 230 to perform interprocedural analysis. Interprocedural analysis is, in general, computationally expensive, and care must be taken to make it practical for very large programs (hundreds of thousands to millions lines of code). IPVA Analysis 231 uses a context-sensitive approach in which the routine is separately considered for each different way it can be called. Context-sensitive analysis requires visiting all possible paths (as expressed by source code) through the call graph, and additionally, may require revisiting paths already traversed because discoveries about information on one path may force reconsideration of other paths already visited. IPVA Analysis 231 uses techniques to minimize the computational costs of a context-sensitive analysis.

IPVA Analysis 231 traverses the call graph by beginning at each root routine and visiting the operations in the routine. At each call operation, it determines whether it can prune processing of the call operation or whether it needs to visit the called routine. If a visit is required, it visits the called routine and its operations. If during the visit to the called routine specific information is learned about the formal parameters or return value of the routine, the caller may be marked for revisiting. This is repeated until the entire call subgraph that begins with the root routine is traversed. This process is repeated for each root of the call graph.

At each visited call operation, IPVA Analysis 231 propagates accumulated knowledge about the arguments at the call site to the formal parameters of the called routine. (The terms "argument" and "formal parameter" follows the conventional terminology in the art; argument is the term used for the entity used to invoke a routine, and "formal parameter" refers to the entity as it exists within the body of the routine, e.g., where its value may be changed, used for assignment etc.) Thus when it visits the called routine, it has information specific to that call of the routine. The accumulated knowledge is represented as Vulnerability Lattices. The formal parameters are represented as Vulnerability Lattices that point indirectly to (or reference) the Vulnerability Lattices describing the argument values. Thus a formal parameter Vulnerability Lattice may point to the Vulnerability Lattice of a variable that was passed as an argument. If that variable's Vulnerability Lattice has specific knowledge of say, the size of a buffer pointed to by the variable, any references to the formal parameter in the called routine would be able to take advantage of that knowledge in determining if the formal was used in a context that might create a security vulnerability. In this way, the Vulnerability Lattices may be used to not only model routine arguments but also to model the Formal parameters and thus be used to model (eventually when analysis is done) the interprocedural effects that result from the call graph flow.

Routines may be revisited via the following procedure. For each visited routine, the process records whether new information is derived about the values in that routine. If that new information affects a formal parameter or the return value of the routine, and that new information could affect the caller because the formal parameter is passed by reference, the affected operations in the caller are marked for revisiting. The revisiting process is guaranteed to terminate because the information is represented as a lattice. Changes in the lattice information are guaranteed to reach a fixed, unchanging state because the lattice structure requires a monotonic direction of change and the lattices all have a finite height. Thus, at some finite number of revisits, operations will no longer be marked for revisiting and the traversal will terminate.

Visiting all paths in a call graph, plus revisiting them as described above may be extremely expensive in time and memory usage as programs get larger. IPVA Analysis 231 limits this by pruning visits to some calls. Pruning is done by not traversing a called routine when a previous traversal has been done with arguments having the same values as the current traversal. This can occur on different call paths to the same call site or on separate call paths to different call sites. This pruning eliminates not only a re-traversal of the called routine, but also a re-traversal of the entire sub call graph below that routine. Data structures may be used to record whether a call path has been traversed and if so whether it has been traversed with the same information; if so, re-traversal is not done.

Accumulated knowledge about arguments is propagated to called routines by 'linking' the Vulnerability Lattices for the formal parameters (Formals) to the Vulnerability Lattices representing the arguments. The Vulnerability Lattice for an argument may itself be linked to a Vulnerability Lattice associated with a Variable. Because of the linking from the Formal to the argument's Vulnerability Lattice to the Variable's Vulnerability Lattice, knowledge about the Variable (memory size, for example) can be used where the Formal is referenced. Conversely, new knowledge about the Variable can be created; new knowledge about the formal (its origin is determined to be external, for example) are propagated directly to the Variable's Vulnerability Lattice. Similarly, if the Vulnerability Lattice for the argument is linked to a Formal's Vulnerability Lattice, the knowledge can be propagated up the call path to whatever that Formal is associated with, possibly reaching a Variable several levels up the call path.

Data Structures

The central data structure of IPVA is a Vulnerability Lattice. Data properties determined by the analysis for each variable in the program are collected together in this structure. These properties consist of information about origin, size and possibly value and are represented using the mathematical lattices discussed earlier.

The input data structures to IPVA are stored in a Collection 1502 as shown in FIG. 15. A Collection gathers the Routines to be analyzed into members which represent the scope of the Routine declarations. Just about any simple aggregate data structure will do for these members. Routines declared with global scope, which are accessible from any compilation unit 1504 within the application being analyzed, are placed in the "Global Routines" member. Classes 1506 are collected into the "Classes" member. A separate data structure representing declarations which have scope only within a single compilation unit are placed in a Compilation Unit object and aggregated in the "Compilation Units" member of Collection.

A Compilation Unit represents the scope of declarations that only apply to a single compilation unit or input file. Its members consist of the input "Filename", a list of the Routines with file scope known as the "File Scope Routines," and a list of the Variables declared at file scope known as the "File Scope Variables."

A Class represents a declaration of an object type. The name of the class in the input declaration is stored as "Class Name". We keep information about the class's position in the inheritance hierarchy by keeping a list of the "Parent Classes" and "Child Classes". All member routines are kept in the list "Member Routines" except those which are have static class scope which are kept in "Member Static Routines". Data members Variables for the type are kept in "Member Fields."

Figure 16:
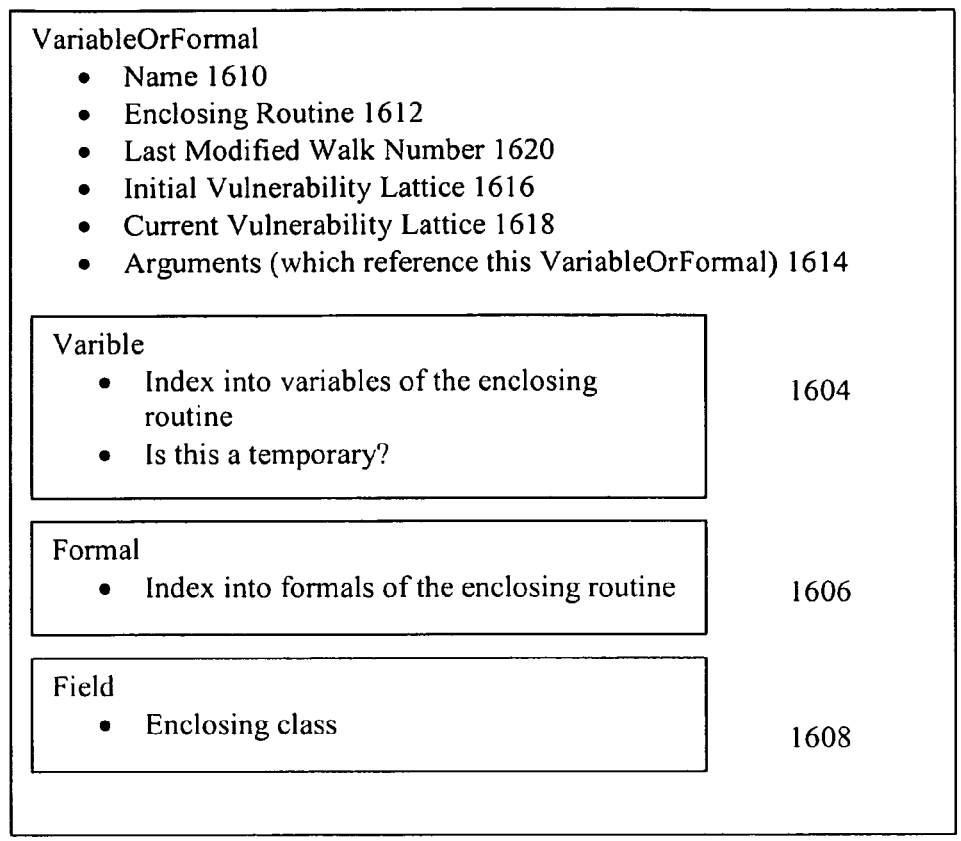
Figure 16:
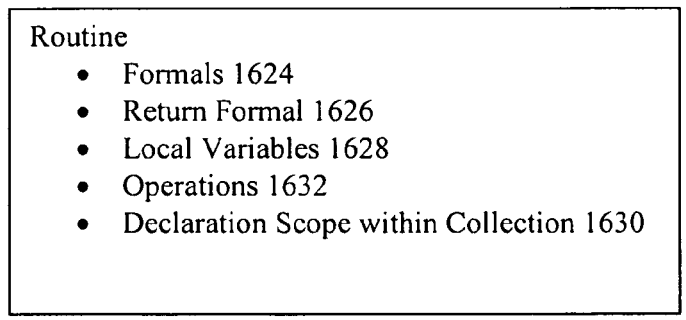

A VariableOrFormal 1602, as shown in FIG. 16, represents the declaration of data storage. It has three subclasses: Variable 1604, which represents a declaration of a new variable, Formal 1606, which represents the formal parameter to a function, and Field 1608 representing the data member field of an object. A VariableOrFormal keeps the "Name" 1610 of the declared variable, the "Enclosing Routine" 1612 in which it is declared, the "Arguments" list 1614 of places where the VariableOrFormal is used, an "Initial Vulnerability Lattice" 1616 calculated for the variable and the "Current Vulnerability Lattice" 1618 which has been produced during analysis. For the Variable and Formal subclasses, we keep track of its index in the list of variables and formals of the enclosing routine. For Fields, we point to the enclosing Class for the data member.

VariableOrFormal 1602 is the first place we see a Walk Number. Walk Numbers act as a form of timestamp for IPVA. Whenever a VariableOrFormal is modified, or some other action occurs which could affect the value of the Vulnerability Lattice inside the VariableOrFormal, the "Last Modified Walk Number" 1620 is update to the current "time". The algorithm uses this information to minimize re-evaluation of the call graph, a major source of the performance gains for IPVA. A Walk Number is implemented using a large unsigned integer which makes comparisons cheap.

A Routine 1622 represents a routine or function from the input program being analyzed. It contains a list of "Formals" 1624 representing the formal parameters, a special Formal 1626 to represent the return value from the Routine if there is one, any "Local Variables" 1628 allocated on the call stack, and the scope 1630 in the Collection class 1502 where the Routine 1622 is declared. In addition, it contains the list of the IPVA Operations 1632 representing the effect of the routine's execution.

Figure 17:
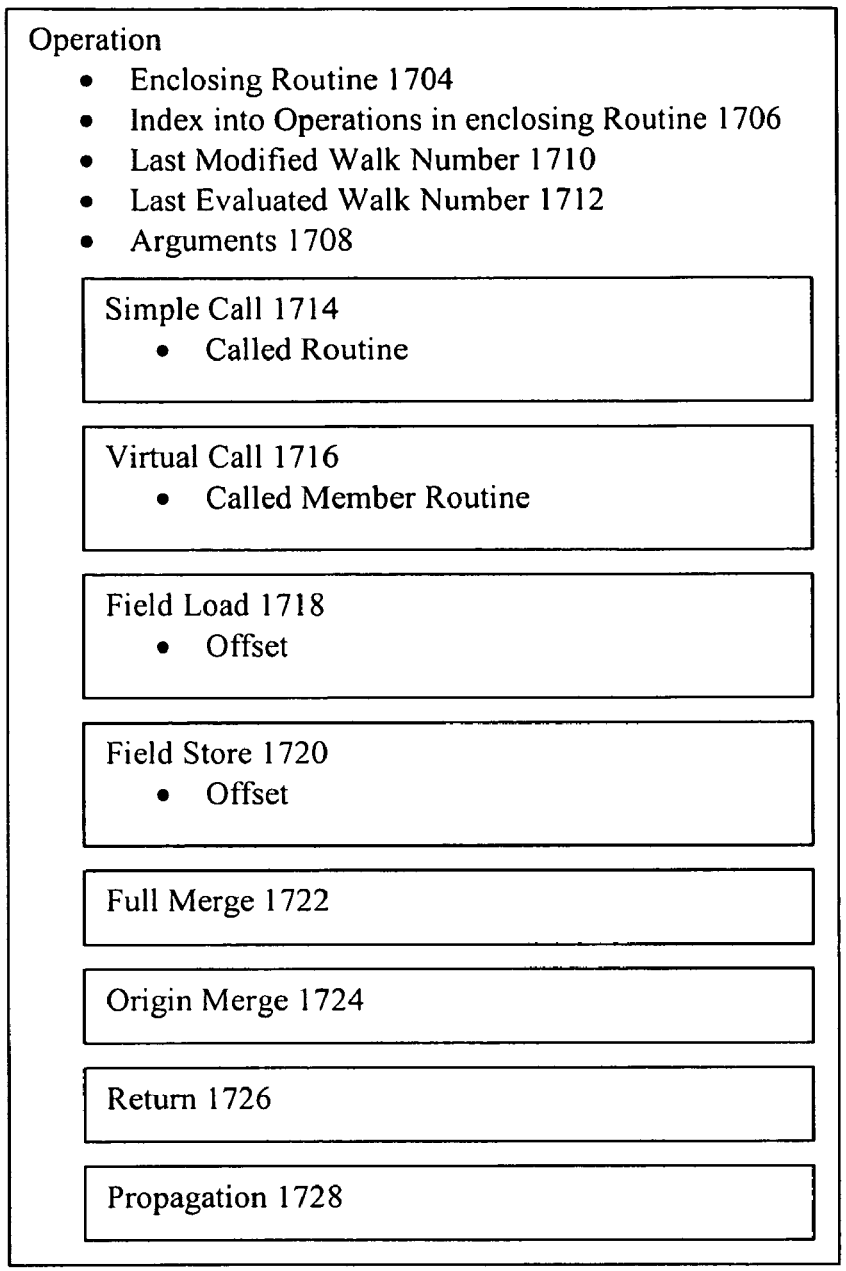
Figure 17:
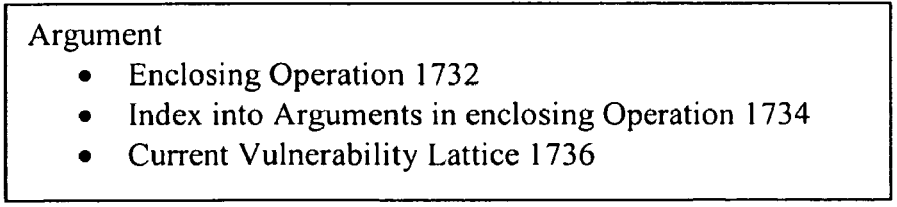

Operations 1702, as shown in FIG. 17, are the core data structure of IPVA, representing the actions to be performed on the data during symbolic execution. An Operation contains a pointer to the "Enclosing Routine" 1704, its index 1706 into the list of Operations in that Routine, a list of "Arguments" 1708 to the routine and two Walk Numbers, one 1710 representing the last time the Operation was evaluated and one 1712 representing the last time input to the Operation was modified.

Operations can be one of eight subtypes representing the type of actions on data which IPVA cares about for determining the analysis result.

Simple Call 1714—represents the passing of the "Arguments" to a call to a Routine. The Routine has either global, class static, or file level scope.

Virtual Call 1716—similar to a Simple Call, but to a bound member function. The "this" pointer is passed as one of the "Arguments"

Field Load 1718—an offset memory dereference relative to some base address. This is used to load object data members as well as index into arrays.

Field Store 1720—the logical opposite of a Field Load, used to store to an offset off some base address Full Merge 1722—merges all of the properties of the argument Vulnerability Lattice into the destination Vulnerability Lattice.

Origin Merge 1724—merges only the origin property (i.e. internal, external) of the argument Vulnerability Lattice into the destination Vulnerability Lattice.

Return 1726—a special form of merge used to merge the argument to a "return" statement into the special "Return Formal".

Propagate 1728—another special merge used to propagate information back up through the non-return Formals. This is used to express side effects on non-constant pointer Formals to a Routine.

An Argument 1730 to an Operation is used to connect the actuals to a call and the formal parameters together. It has a pointer to its enclosing Routine 1732 and an index 1734 into the list of arguments to the Routine, as well as a Vulnerability Lattice 1736 used to link references to the Formal within the body of the Routine to the actual in the caller up the call graph. The Argument data structure is used for linking. It is used to model the operands to the operations in 1702.

A Call Path Element 1802 is used to represent the calling context of a Routine call. A list of Call Path Elements can represent an inverse of the call path by which we arrive at a particular instance of a Routine in the call graph. A Call Path Element consists of a pointer to the "Called Routine" 1804, the depth 1806 of this element in the call graph, and a pointer up the call graph consisting of a Call Path Element for the parent in the call graph and the call Operation within the parent which spawned this instance of the Routine.

We track how tainted data moves through the program using Tainted Traces 1814. A Tainted Trace consists of a pointer to the "Root Routine" 1816, which is the position in the call graph where the sub-graph which contains the source of external data meets the sub-graph which contains the sink of that data. Each Routine invocation along the path, going up the graph from the source to the root and then from the root down to the sink, is represented as a list of Tainted Trace Elements 1818. Each tainted trace element 1820 contains a pointer to the Argument which is passing the external data, the context 1824 in which external data is passed represented by a Call Path Element, and the direction 1826 external data is propagating (either up from the source to the root or from the root down to the sink). This information can later be translated in a graphical representation of how exactly external data was brought into the program, where that external data travels within the program, and how that data may finally effect the secure execution of the algorithm.

EXAMPLES

Simple Intraprocedural Example with Walk Thru

Consider the following case, where an input string is read and then written in a single method.

```
void main( ) {
    char buf[100];
    fgets(buf, sizeof(buf), stdin);
    fputs(buf, stdout);
}
```

This is a simple example, which is intended to illustrate how analysis will take place within a single routine. First, the Routine-Level IR is constructed. It looks something like the following (entities preceding the colons refers to the IPVA data structures described above):

Routine main
    Formals:
    Variables: $buf_{Variable}$ -> $buf_{lattice}$ [block, blocksize=100, stack, all else ⊤]
    Operations:
        Call: fgets
            Argument 1: Lattice → $buf_{lattice}$
            Argument 2: 100
            Argument 3: ???
        Call: fputs
            Argument 1: Lattice → $buf_{lattice}$
            Argument 2: ???

When the calls are analyzed, we get the following calls:

1. fgets: Special case, check to see if Argument 1.blocksize >= Argument 2, if so then merge with a lattice with the properties [Block, Blocksize=100, Datasize=100, Null Terminated, External, memory_kind=low]. This updates the $buf_{lattice}$ to [Block, Blocksize=100, Datasize=100, Null Terminated, External, Stack].
2. fputs: Special case, check to see if it is null terminated.

Now, the value of $buf_{lattice}$ is [Block, Blocksize=100, Datasize=100, Null Terminated, External, Stack].

Calling the Action Objects yields:

1. fgets: No vulnerability 2. fputs: No vulnerability

Simple Interprocedural Example with Walk Thru

Consider the following case, where an input string is read and then written across several methods.

```
void main( ) {
    char buf[100];
    input (buf, sizeof(buf);
    output(buf);
}
static void input(char *x, int len) {
    fgets(x, len, stdin);
}
void output(const char *y) {
    fputs(y, stdout);
}
```

This is a simple example, which is intended to illustrate how analysis will take place across a small number of routines. First, the Routine-Level IR is constructed. It looks something like:

1. Routine main
   Formals:
   Variables:
      v1.1 $buf_{Variable}$ -> lat 1.1 $buf_{lattice}$ [block, blocksize=100, stack, all else T]
   Operations:
      op1.1 Call: input
         arg1.1.1 Argument 1: lat 1.2 Lattice -> lat1.1 $buf_{lattice}$
         arg1.1.2 Argument 2: lat 1.3 100
      op1.2 Call: output
         arg1.2.1 Argument 1: lat 1.4 Lattice -> lat1.1 $buf_{lattice}$
2. Routine input
   Formals:
      f2.1 $x_{Formal}$ -> lat2.1 $X_{Lattice}$ [block, all T]
      f2.2 $len_{Formal}$ -> lat2.2 $len_{Lattice}$ [integer, all T]
   Operations:
      op2.1 Call: fgets
         arg2.1.1 Argument 1: lat2.3 Lattice -> lat2.1 $x_{lattice}$
         arg2.1.2 Argument 2: lat2.4 Lattice -> lat2.2 $len_{Lattice}$
         arg2.1.3 Argument 3: lat2.5 Lattice ???
3. Routine output
   Formals:
      f3.1 $y_{Formal}$ -> lat3.1 $y_{Lattice}$ [block, all T]
   Operations:
      op3.1 Call: fputs
         arg3.1.1 Argument 1: lat3.2 Lattice -> lat3.1 $y_{lattice}$
         arg3.1.2 Argument 2: lat3.3 Lattice ???

Next, a call graph is constructed:

1. Routine main
   Operations:
      op1.1 Call: input → Routine input (2)
      op1.2 Call: output → Routine output (3)
2. Routine input
   Called from: op1.1
3. Routine output
   Called from: op1.2

Now, the traversal of the call graph begins. This iterates over the call graph (with the pruning described above) to determine how the Vulnerability Lattices will be changed or refined. This iteration is context sensitive so that the Vulnerability Lattices are refined to model the range of values variables may have from the constrained universe of call graph possibilities expressed by the source code and modeled by the call graph.

1. global_walk_number := 1
   Process Routine main (1)
   Routine main->walk_number := 1
2. global_walk_number := 2
   process op1.1 Call: input -> Routine input (2)
   link lat2.1 -> lat1.2 -> lat1.1 for buf
      merge T -> lat1.1 (no effect)
   link lat2.2 -> lat1.3
3. Process Routine input (2)
   push Routine input (2) on the stack
   Routine input->walk_number := 2
4. global_walk_number := 3
   process op2.1 Call: fgets -> special case fgets
   examine lat2.3 -> lat2.1 (f3.1 y) -> lat1.2 -> lat1.1
   (v1.1 buf)
      [block, blocksize=100, stack, all else T]
   examine lat2.4 -> lat2.2 (f2.2 x) -> lat1.3 (int 100)
      [int, value=100]
   examine lat2.5 (???)
   Special Case processing for fgets: because lat2.3 blocksize=100 ≧ lat2.4 value=100 ->

-continued

```
                merge lat2.3->lat2.1->lat1.2->lat1.1 with
[datasize=1:100, null terminated, external] ->
                [block, blocksize=100, stack, datasize=1:100, null terminated, external]
            Propagate_Lattice_Upward:
                lat2.3 -> lat2.1 -> lat1.2 -> lat1.1
                    <walk 1 -> 3> lat1.1
                    <walk 1 -> 3> v1.1 buf
                    <walk 1 -> 3>   arg1.1.1
                    <walk 1 -> 3>      op1.1 (modify_walk_number)
                    <walk 0 -> 3>         Routine input(2)
                    <walk 0 -> 3>    arg1.2.1
                    <walk 0 -> 3>      op1.2 (modify_walk_number)
                    <walk 0 -> 3>         Routine output(3)
                <walk 1 -> 3> f2.1 x
                <walk 1 -> 3> op2.1 (modify_walk_number)
            fgets has action object, so walk up the execution stack:
                mark may_have_action_object := true for Routine
input (2)
                mark may_have_action_object := true for Routine
main (1)
            mark Op2.1 Call: evaluate_walk_number := 3;
5.      Routine input->walk_number (2) != saved_walk_number
(3)
                => Force Rescan
6.      starting_walk_number := 3
        Routine input (2)->walk_number := 3
7.      global_walk_number := 4
        process op2.1 Call: fget
            op2.1 Call: evaluated_walk_number (3) ≦
modified_walk_number (3)
                → No rescan of op2.1
8.          pop Routine input (2) off the stack
        Unlink lat2.1 -> lat1.2
        Unlink lat2.2 -> lat1.3
        global_walk_number := 5
        Mark Op1.1 Call: evaluated_walk_pointer := 5
9.      global_walk_number := 6
        process 1.2 Call: output -> Routine output (3)
        link lat3.1 -> lat1.4 -> lat1.1 for buf
10.     Process Routine output (3)
            push Routine output (3) on the stack
            Routine output->walk_number := 6
11.         global_walk_number := 7
        process op3.1 Call: fputs -> special case fputs
        examine lat3.2 -> lat3.1 (f3.1 y) -> lat1.4 -> lat1.1
(v1.1 buf)
            [block, blocksize=100, stack, all else ⊤]
        examine lat3.3 (???)
        Special Case processing for fputs: nothing happens
        fputs has action object, so walk up the execution stack:
            mark may_have_action_object := true for Routine
output (2)
            mark may_have_action_object := true for Routine
main  (1)
12.         pop Routine output (3) off the stack
        Unlink lat3.1 -> lat1.4
        global_walk_number := 8
        Mark Op1.2 Call: evaluated_walk_pointer := 8
13.     Because r->walk_number (3) != starting_walk_number (1), we
loop
14.     global_walk_number := 9
        Op1.1 Call: modified_walk_number (3) ≦
evaluated_walk_number (5)
            → No rescan of op
15.     global_walk_number := 10
        Op1.2 Call: modified_walk_number (3) ≦
evaluated_walk_number (8)
            → No rescan of op
16.     Because r->walk_number (3) == starting_walk_number (3), we
stop.
```

As explained above, once the IPVA analysis is done, the Vulnerability Lattices are more refined to include the inter-procedural effects. The Vulnerability lattices may then be used in conjunction with the database to identify whether routine calls present vulnerabilities. The results of the analysis may then be reported to a software developer in any of a variety of ways including printed or displayed reports. These reports may be used to identify the specific type of vulnerability (as discussed above or as discussed in the related applications) and identify the portions of code (including Tainted Traces) that may be the cause of the potential vulnerability.

This application incorporates the following U.S. patent applications by reference in their entireties:

"Method and System for Detecting Race Condition Vulnerabilities in Source Code," filed on Apr. 15, 2004, U.S. application Ser. No. 10/824,685;

"Method and System for Detecting Privilege Escalation Vulnerabilities in Source Code," also filed on Apr. 15, 2004, U.S. application Ser. No. 10/824,684; and "Method and System for Detecting Vulnerabilities in Source Code," filed on Apr. 15, 2004, U.S. application Ser. No. 10/825,007.

While the invention has been described in connection with certain preferred embodiments, it will be understood that it is not intended to limit the invention to those particular embodiments. On the contrary, it is intended to cover all alternatives, modifications and equivalents as may be included in the appended claims. Some specific figures and source code languages are mentioned, but it is to be understood that such figures and languages are, however, given as examples only and are not intended to limit the scope of this invention in any manner.

What is claimed is:

1. A computer implemented method of detecting vulnerabilities in a pre-existing source code listing, stored in computer readable medium having computer executable instructions, said source code listing having a plurality of routines and a plurality of calls to routines, said source code listing further having an inherent control flow and an inherent data flow during the computer execution thereof, said computer implemented method comprising the acts of:

analyzing the control flow and data flow of the source code listing and modeling the variables in the source code listing in the context of at least one of the inherent control flow and inherent data flow, in which each model specifies pre-determined characteristics about each variable;

using the variable models to create models of arguments to routine calls in the source code listing;

modeling the source code listing with a call graph to represent routine call interactions expressed in the source code listing;

traversing the call graph in modeling the arguments to routine calls to account for inter-procedural effects and dependencies on changes in ranges of possible values of the arguments as expressed in the source code listing, wherein said traversing is controlled by rules to limit computational costs of the modeling;

using the argument models in conjunction with pre-specified criteria for the corresponding routine calls to determine whether the routine calls possess vulnerabilities as a consequence of the ranges of possible values of the arguments and known routine behavior; and generating a report, usable by a user, that identifies the vulnerabilities.

2. The method of claim 1 wherein the modeling of the routine arguments is context sensitive.

3. The method of claim 1 wherein the call graph model includes paths and wherein a path may be traversed a plurality of times depending on the expression of the source code listing.

4. The method of claim 3 wherein a path is not re-traversed if it has been previously traversed with the same models and with the same values for said models.

5. The method of claim 1, wherein the rules reduce computational time for said traversing and said modeling of the arguments.

6. The method of claim 1, wherein the rules reduce memory usage for said traversing and said modeling of the arguments.

7. The method of claim 1, wherein the rules specify conditions under which a path in the call graph will be avoided.

8. The method of claim 1, wherein said traversing of the call graph comprises propagating, at each call cite, accumulated knowledge about arguments at the call cite to the formal parameters of the called routine.

9. The method of claim 8, wherein the accumulated knowledge about each argument is represented as a vulnerability lattice.

10. The method of claim 9, wherein the propagating comprises linking vulnerability lattices of the formal parameters to the vulnerability lattices of the corresponding arguments.

11. The method of claim 8, wherein said traversing of the call graph further comprises:

determining, at a routine call, that new information is derived about formal parameters or return values of that routine; and marking an operation in the caller of the routine call for revisiting if the operation is affected by the new information.

12. The method of claim 8, wherein said traversing of the call graph further comprises:

recording, for each routine call, information regarding whether the routine call has been previously traversed, and if so, information relating to values of arguments for the routine call during the previous traversal; and avoiding re-traversing a call cite in the call graph and the sub call graph below that call cite if the associated routine call has been previously traversed with arguments having the same ranges of values as a current traversal.

* * * * *